US011512008B2

(12) United States Patent
Jaffrey

(10) Patent No.: US 11,512,008 B2
(45) Date of Patent: Nov. 29, 2022

(54) WASTE WATER MANAGEMENT

(71) Applicant: Breakthrough Technologies, LLC, Boston, MA (US)

(72) Inventor: Kamal Jaffrey, Winchester, MA (US)

(73) Assignee: Breakthrough Technologies, LLC, Boston, MA (US)

( * ) Notice: Subject to any disclaimer, the term of this patent is extended or adjusted under 35 U.S.C. 154(b) by 62 days.

(21) Appl. No.: 15/734,817

(22) PCT Filed: Jun. 3, 2019

(86) PCT No.: PCT/US2019/035107
§ 371 (c)(1),
(2) Date: Dec. 3, 2020

(87) PCT Pub. No.: WO2019/236438
PCT Pub. Date: Dec. 12, 2019

(65) Prior Publication Data
US 2021/0230018 A1    Jul. 29, 2021

Related U.S. Application Data

(60) Provisional application No. 62/680,039, filed on Jun. 4, 2018.

(51) Int. Cl.
*B01D 1/00* (2006.01)
*C02F 1/04* (2006.01)
(Continued)

(52) U.S. Cl.
CPC ............ *C02F 1/048* (2013.01); *B01D 1/007* (2013.01); *B01D 1/0076* (2013.01);
(Continued)

(58) Field of Classification Search
CPC .. C02F 1/048; C02F 1/302; C02F 1/32; C02F 1/38; C02F 1/463; C02F 9/00;
(Continued)

(56) References Cited

U.S. PATENT DOCUMENTS 2,334,063 A * 11/1943 Brockman ............... C12F 3/10
426/247
2,434,672 A * 1/1948 Pattee ...................... C12F 3/10
426/456
(Continued)

FOREIGN PATENT DOCUMENTS

DE    4005520 A1    8/1991
EP    0574972 A1    12/1993
(Continued)

OTHER PUBLICATIONS

Tewari, et al. (2007) "Water Management Initiatives in Sugarcane Molasses based Distilleries in India", Resources, Conservation, and Recycling, 52(2):351-367.
(Continued)

*Primary Examiner* — Joseph W Drodge
(74) *Attorney, Agent, or Firm* — Mintz Levin Cohn Ferris Glovsky and Popeo, P.C.

(57) ABSTRACT

A system includes a first separator configured to receive waste water, retain a first portion of the waste water, and separate the first portion of the waste water into a first vapor and a first solid material; and a second separator in fluid communication with the first separator, the second separator being configured to receive a second portion of the waste water from the first separator and to separate the second portion of the waste water into a second vapor and a second solid material, the second separator including a first condenser, a heating element, and a first electrocoagulation unit. Related apparatus, systems, techniques and articles are also described.

34 Claims, 21 Drawing Sheets

(51) Int. Cl.
*C02F 1/32* (2006.01)
*C02F 1/38* (2006.01)
*C02F 1/46* (2006.01)
*C02F 9/00* (2006.01)
*C02F 1/30* (2006.01)
*C02F 1/463* (2006.01)
*C02F 1/00* (2006.01)
*C02F 103/32* (2006.01)
*C02F 103/36* (2006.01)

(52) U.S. Cl.
CPC ......... B01D 1/0082 (2013.01); B01D 1/0088 (2013.01); C02F 1/008 (2013.01); C02F 1/302 (2013.01); C02F 1/32 (2013.01); C02F 1/38 (2013.01); C02F 1/463 (2013.01); C02F 9/00 (2013.01); *C02F 2103/32* (2013.01); *C02F 2103/365* (2013.01); *C02F 2209/005* (2013.01)

(58) Field of Classification Search
CPC ............ C02F 2103/32; C02F 2103/365; C02F 2209/005; C02F 2103/005; C02F 2103/10; C02F 2201/46135; C02F 1/16; C02F 3/28; C02F 2101/325; C02F 2103/008; C02F 2103/325; C02F 2209/006; C02F 2209/008; C02F 2209/02; C02F 2209/03; C02F 2209/06; C02F 2209/42; C02F 2301/043; C02F 2301/08; C02F 2303/10; C02F 1/04; C02F 1/043; C02F 2301/10; B01D 3/42; B01D 3/007; B01D 1/0088; B01D 1/26; B01D 3/146; B01D 1/0082; B01D 21/0009; B01D 21/009; B01D 21/01; B01D 21/2461; B01D 1/0011; B01D 1/0064; B01D 1/007; B01D 1/0076; B01D 3/008; B01D 3/148; B01D 17/0217; B01D 21/26; B01D 21/267; B01D 21/34; Y02W 10/37; C12H 1/06; C12H 1/061; C12H 1/16; C12F 3/00; C12F 3/10; C12P 1/06; C12P 1/08
See application file for complete search history.

(56) References Cited

U.S. PATENT DOCUMENTS

| | | | | |
|---|---|---|---|---|
| 3,956,061 | A * | 5/1976 | Young | C12F 3/10 159/4.04 |
| 4,295,946 | A * | 10/1981 | Nazarian | C02F 1/463 204/241 |
| 7,731,854 | B1 | 6/2010 | Herbst | |
| 2002/0040855 | A1* | 4/2002 | Morkovsky | C02F 1/463 204/554 |
| 2002/0117455 | A1* | 8/2002 | Moghe | C02F 1/5245 210/723 |
| 2011/0233136 | A1* | 9/2011 | Enos | C02F 9/00 210/631 |
| 2012/0228117 | A1* | 9/2012 | Panunzio | C02F 9/00 203/10 |
| 2013/0199918 | A1* | 8/2013 | Jones | C10B 57/08 201/20 |
| 2013/0341267 | A1* | 12/2013 | Prasad | C02F 3/005 210/605 |
| 2013/0344554 | A1* | 12/2013 | Bleyer | C12P 7/06 203/28 |
| 2015/0041127 | A1 | 2/2015 | Kuki et al. | |
| 2015/0060286 | A1 | 3/2015 | Govindan et al. | |
| 2015/0191750 | A1* | 7/2015 | Bleyer | C12P 7/06 435/71.1 |
| 2015/0315055 | A1* | 11/2015 | Chidambaran | C02F 9/00 166/266 |
| 2016/0145122 | A1 | 5/2016 | Wilson | |
| 2017/0158503 | A1* | 6/2017 | Foody | C07C 29/1518 |
| 2018/0134578 | A1 | 5/2018 | Jaffrey | |

FOREIGN PATENT DOCUMENTS

| | | |
|---|---|---|
| FR | 1595843 A | 6/1970 |
| FR | 2513984 A1 | 4/1983 |
| WO | 2006095340 A1 | 9/2006 |
| WO | 2012136064 A1 | 10/2012 |

OTHER PUBLICATIONS

PCT Search Report and Written Opinion issued in connection with corresponding PCT Application No. PCT/US2019/035107 dated Dec. 12, 2019.

* cited by examiner

| Product Part | Part Name | Specification | Quantity |
|---|---|---|---|
| Electronics | | | |
| | PLC | 36 Digital IN – 24 Digital OUT | 1 |
| | Analog Module | 4 Analog IN – 2 Analog OUT | 6 |
| | Temperature Module | 4 Analog IN | 4 |
| | HMI | 15 inch | 1 |
| | HMI TO PLC Communication | 1 m | 1 |
| | level Detector | 6 m | 6 |
| | Relays | 2 pole 24 volt | 12 |
| | Pressure transmitters | 0-10 bar | 6 |
| | Digital Module | 8 Digital IN – 6 Digital OUT | 1 |
| | Contactocs/SSR | 9 to 20 Amp | 4 |
| | Ph Meter | 0 to 14 Ph values | 12 |
| | Flow meter | Fluid type | 8 |
| | Temperature probes | K type | 18 |
| Mechanical | | | |
| | Purifier | Material: Mild steel | 5 |
| | Stand | Material: Mild steel | 6 |
| | Hydrocyclone | Material. SS | 1 |
| | Copper Condenser | Number of tube | 5 |
| | Connection Pipe | 6" Metal Pipe | 10 |
| | Flange | 6" Metal Flange | 10 |
| | Copper Pipe | as per placement | 2 |
| | Ball valve | 6" ball valve | 6 |
| | Suction Blower | 30 to 40 m³/hr | 5 |
| | Flow Pump | 18m³/hr (as we have digester capacity of 430m³/d) | 1 |
| | Demister | SS material | 5 |
| | Screw Conveyer | | 1 |
| | Solenoid valves | 6" Metal | 6 |
| | Handle valve | 6" Metal | 6 |
| Electrical | | | |
| | Heating element | 5 kW | 5 |
| | Air Blower | | |
| | Magnetron | Magnetron | 1 |
| | EC Unit | Customize | 5 |

FIG. 8

WASTE WATER MANAGEMENT

CROSS-REFERENCE TO RELATED APPLICATIONS

This application is a national stage application filed under 35 U.S.C. 371, of International Patent Application No. PCT/US19/35107 filed May 29, 2019, which claims priority from U.S. Provisional Application No. 62/680,038, filed on Jun. 4, 2018, the disclosure of each of which is hereby expressly incorporated herein by reference in theirs entirety.

TECHNICAL FIELD

The current subject matter is generally related to waste water processing systems.

BACKGROUND

Distilleries produce alcohol by a process of distillation. Distillation is a process of separating components from a mixture by selective boiling and condensation. For alcohol production, the mixture, referred to as a wash, is created using ethanol fermentation. Ethanol fermentation is a biological process in which sugars such as glucose, fructose, and sucrose are converted into cellular energy, producing ethanol and carbon dioxide as by-products. One common source of sugars for distillation is molasses, which is a byproduct of refining sugar cane, or sugar beets, into sugar.

During distillation, heat is applied to the wash such that light components of the wash, including ethanol, evaporate. Heat is removed from the vapor such that it condenses, and the liquid is stored in a separate container from the wash. This process can be repeated multiple times to increase concentration of ethanol in the liquid. Portions of the wash that remain after distillation are referred to as distillery effluent, spent wash, or waste water.

Spent wash is a mixture of liquid and solid components, and is a rich source of organic matter and nutrients such as nitrogen, phosphorus, potassium, calcium, and sulfur. Spent wash can also contain micro-nutrients such as iron, zinc, copper, manganese, boron, and molybdenum. However, spent wash is acidic, and it has high biochemical oxygen demand (BOD) and chemical oxygen demand (COD). If the spent wash is released into the environment untreated, it can pollute water sources by increasing acidity and consuming dissolved oxygen, which can endanger aquatic life and other organisms.

SUMMARY

In an aspect, a system includes a first separator configured to receive waste water, retain a first portion of the waste water, and separate the first portion of the waste water into a first vapor and a first solid material; and a second separator in fluid communication with the first separator, the second separator being configured to receive a second portion of the waste water from the first separator and to separate the second portion of the waste water into a second vapor and a second solid material, the second separator including a first condenser, a heating element, and a first electrocoagulation unit. The first condenser is in fluid communication with the first separator, the first condenser being configured to receive the first vapor from the first separator and transfer heat from the first vapor to the second portion of the waste water, thereby condensing the first vapor into a first liquid. The heating element is configured to generate heat and transfer the heat to the second portion of the waste water, wherein heat from the first vapor and heat from the heating element cause at least a portion of the second portion of waste water to evaporate, thereby forming the second vapor within the second separator. The first electrocoagulation unit includes at least one first electrocoagulation cell that includes a first anode and a first cathode that are in contact with the second portion of the waste water, the at least one first electrocoagulation cell being configured to separate suspended solids from the second portion of the waste water, the separated suspended solids forming at least a portion of the second solid material.

One or more of the following features can be included in any feasible combination. The first separator can include a second condenser in fluid communication with the second separator, the second condenser being configured to receive the second vapor from the second separator and transfer heat from the second vapor to the first portion of the waste water, thereby condensing the second vapor into a second liquid. The first separator can include a second electrocoagulation unit having at least one second electrocoagulation cell in contact with the first portion of the waste water, the at least one second electrocoagulation cell being configured to separate suspended solids from the first portion of the waste water, the separated suspended solids forming at least a portion of the first solid material.

The system can include a controller in electronic communication with the heating element and the first electrocoagulation, the controller being configured to control the amount of heat generated by the heating element and to control a first voltage differential between the anode and the cathode of at least one first electrocoagulation cell, and the first voltage differential determines a rate at which suspended solids are separated from the second portion of the waste water. The second separator can include a magnetron configured to generate microwaves and direct at least a portion of the microwaves at the second portion of the waste water within the second separator, thereby heating the second portion of the waste water. The system can include a preliminary separator in fluid communication with the first separator, the preliminary separator being configured to receive waste water and to separate insoluble solid material from the waste water, remove the insoluble solid material from the waste water, and provide the waste water to the first separator. The preliminary separator can include a hydrocyclone configured to direct the received waste water tangentially about an interior surface of the hydrocyclone, thereby generating a reactive centrifugal force that acts on the received waste water to separate the insoluble solid material from the received waste water. The system can include at least one first pressure sensor coupled to the second separator, the at least one first pressure sensor being configured to measure a pressure of the second vapor within the second separator. The system can include at least one second pressure sensor coupled to the first separator, the at least one second pressure sensor being configured to measure a pressure of the first vapor within the first separator.

The system can include a first level meter positioned within the second separator, the first level meter being configured to measure an amount of the second portion of waste water. The system can include a first demister positioned within the second separator, the first demister being configured to remove liquid droplets entrained within the second vapor. The system can include a second demister positioned within the first separator, the second demister being configured to remove liquid droplets entrained within the first vapor.

In another aspect, a method includes receiving waste water at a first separator, and retaining a first portion of the waste water within the first separator; receiving, at a second separator, a second portion of waste water from the first separator; generating a first voltage differential between a first anode and a first cathode of a first cell of a first electrocoagulation unit to remove suspended solids from the second portion of waste water; receiving a first vapor from the first separator at a first condenser within the second separator; transferring heat from the first vapor to the second portion of the waste water, thereby condensing the first vapor into a first liquid; generating heat using first heating element within the second separator; transferring the heat to the second portion of waste water, wherein heat from the first vapor and heat from the heating element cause at least a portion of the second portion of waste water to evaporate, thereby forming a second vapor within the second separator; and providing the second vapor to a second condenser within the first separator.

The method can include receiving the second vapor at the second condenser; and transferring heat from the second vapor to the first portion of waste water, thereby condensing the second vapor into a second liquid. The method can include generating a second voltage differential between a second anode and a second cathode of a second cell of a second electrocoagulation unit to remove suspended solids from the first portion of waste water. The method can include generating microwaves using a magnetron; and directing at least a portion of the microwaves toward the second portion of waste water, thereby heating the second portion of waste water.

The method can include measuring a pressure of the second vapor within the second separator using at least one first pressure sensor coupled to the second separator. The method can include measuring a pressure of the first vapor within the first separator using at least one second pressure sensor coupled to the first separator. The method can include removing liquid droplets entrained within the second vapor using a first demister positioned within the second separator. The method can include removing liquid droplets entrained within the first vapor using a second demister positioned within the first separator.

In yet another aspect, a system includes a first separator configured to receive waste water, retain a first portion of the waste water, and separate the first portion of the waste water into a first vapor and a first solid material, the first separator including a first condenser and a first electrocoagulation unit. The first separator can also include a heating element.

One or more of the following features can be included in any feasible combination. The system can further include a second separator in fluid communication with the first separator, the second separator being configured to receive a second portion of the waste water from the first separator and to separate the second portion of the waste water into a second vapor and a second solid material. The second separator can include a second condenser in fluid communication with the first separator, the second condenser being configured to receive the first vapor from the first separator and transfer heat from the first vapor to the second portion of the waste water, thereby condensing the first vapor into a first liquid. The second separator can further include a heating element configured to generate heat and transfer the heat to the second portion of the waste water, wherein heat from the first vapor and heat from the heating element cause at least a portion of the second portion of waste water to evaporate, thereby forming the second vapor within the second separator. The second separator can further include a second electrocoagulation unit having at least one first electrocoagulation cell that includes a first anode and a first cathode that are in contact with the second portion of the waste water, the at least one first electrocoagulation cell being configured to separate suspended solids from the second portion of the waste water, the separated suspended solids forming at least a portion of the second solid material.

The system can include a total of n separators (n being a natural number; n≥2), wherein, for an i-th separator (i being any natural number; 2≤i≤n), the i-th separator is in communication with the (i−1)-th separator, the i-th separator configured to receive an i-th portion of the waste water from the (i−1)-th separator and to separate the i-th portion of the waste water into an i-th vapor and an i-th solid material, the i-th separator including an i-th condenser and an i-th electrocoagulation unit. The n-th separator can include a heating element configured to generate heat and transfer the heat to the n-th portion of the waste water, wherein heat from the (n−1)-th vapor and heat from the heating element cause at least a portion of the n-th portion of waste water to evaporate, thereby forming the n-th vapor within the n-th separator. The n-th separator can further include a magnetron configured to generate microwaves and direct at least a portion of the microwaves at the n-th portion of the waste water within the n-th separator, thereby heating the n-th portion of the waste water. At least one of the first to the n-th separators can include a demister configured to remove liquid droplets entrained within vapor.

The system can further include a preliminary separator in fluid communication with the first separator, the preliminary separator being configured to receive waste water and to separate insoluble solid material from the waste water, remove the insoluble solid material from the waste water, and provide the waste water to the first separator. The preliminary separator can be a hydrocyclone configured to direct the received waste water tangentially about an interior surface of the hydrocyclone, thereby generating a reactive centrifugal force that acts on the received waste water to separate the insoluble solid material from the received waste water.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 8 is a table illustrating specifications for an example implementation according to some aspects of the current subject matter;

DETAILED DESCRIPTION

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

As described above, spent wash is a byproduct that results from distilled alcohol production. The spent wash is acidic, and it has high biochemical oxygen demand (BOD) and chemical oxygen demand (COD). Other waste water streams produced by industrial processes, such as oil refinery, can similarly be acidic and/or have high BOD and COD. If the waste water is released into the environment untreated, it can pollute water sources by increasing acidity and consuming dissolved oxygen, which can endanger aquatic life and other organisms. The current subject matter relates to treating waste water having high BOD and COD such that the nutrients from the waste water can be more safely utilized. In one embodiments, a waste water treatment system is provided. The waste water treatment system can include an array of separator vessels coupled in series. The array of separator vessels can be configured to separate solid and liquid portions of waste water using a combination of distillation and electrocoagulation processes. Distillation and electrocoagulation process can function with minimal moving parts, thereby facilitating simplified design of the treatment system. By separating waste water is into solid and liquid portions, each portion can be more easily managed. For example, solid material from the waste water can be used as fertilizer. The liquid portion of the waste water can be treated.

The current subject matter can include a cascade of evaporators/separators in which stages use an output stream of a previous stage to heat or supplement the heat used to evaporate/separate liquid in the given stage. Using the output of a previous stage as a heat source, thermal energy can be recycled, thus lowering the energy demands and costs of the system. Because of the lower energy demands (e.g., higher efficiency), evaporators can be utilized for some applications that were previously unfeasible.

Figure 1:
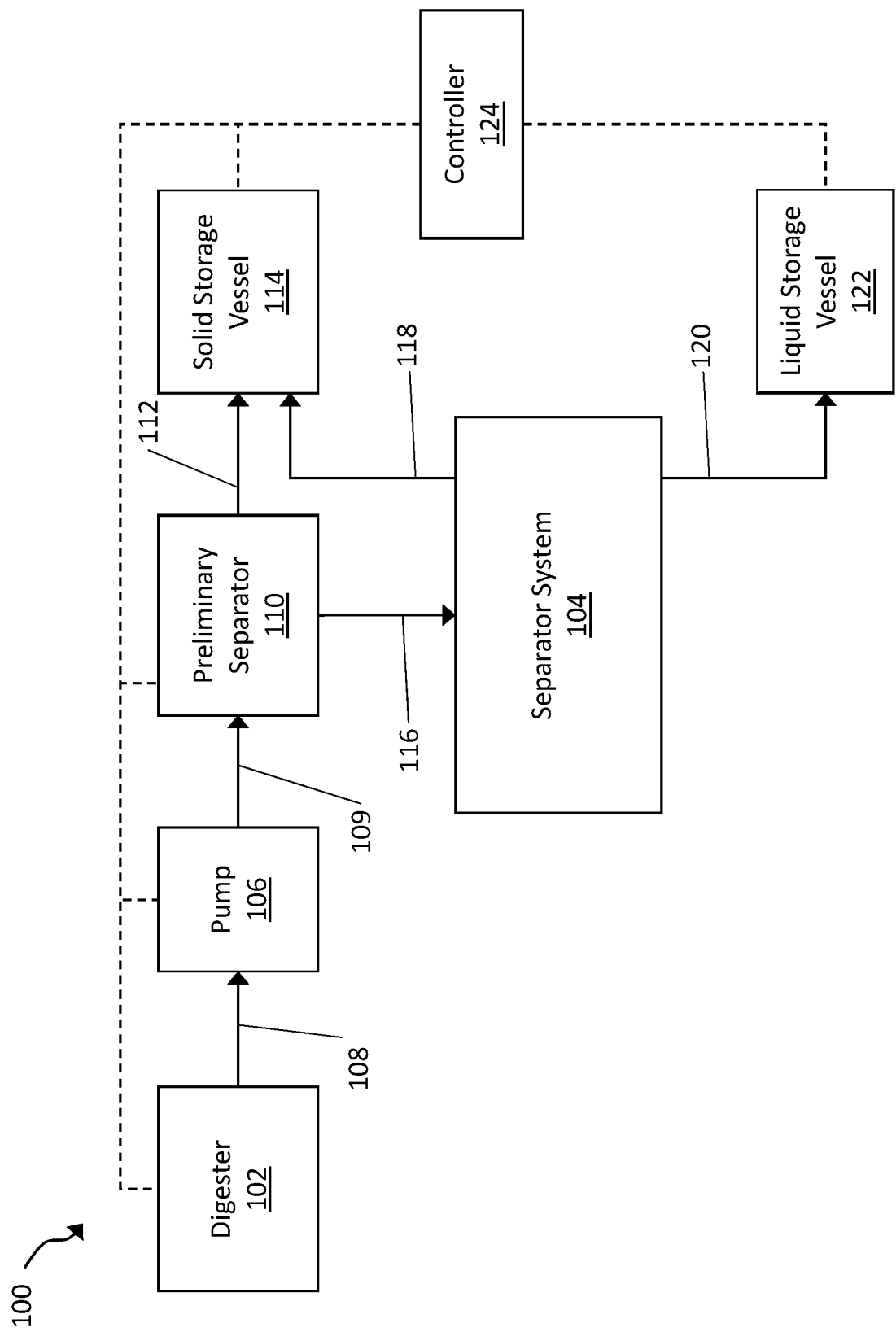
FIG. 1 is a block diagram of an exemplary embodiment of a treatment system that can be used to treat spent wash.

FIG. 1 shows an example of a treatment system 100 that can be configured to treat waste water such as spent waste or waste output from an oil refinery. In the illustrated example, the treatment system 100 includes a digester 102 configured to processes waste water, and a separator system 104 that can be configured to separate liquid and solid portions of the waste water. Initially, a pump 106 receives waste water 108 from the digester 102 and pumps the waste water 109 to a preliminary separator 110. The preliminary separator 110 functions to separate a portion 112 of insoluble solid material from the waste water 109. In some embodiments, the preliminary separator 110 can be configured to classify, separate, and/or sort solids in the waste water based on ratios of centripetal force to fluid resistance. In an exemplary embodiment, the preliminary separator 110 can be a hydrocyclone. The hydrocyclone can be configured to receive the waste water 109 and direct the incoming waste water 109 tangentially about a cylindrical, or cylindroconical, surface of the hydrocyclone, thereby generating a reactive centrifugal force that acts on the waste water within the hydrocyclone. The reactive centrifugal force can cause components of the waste water to be separated based on density. For example, more dense components of the waste water such as, e.g., portions containing higher concentrations of solid materials, can be separated from less dense portions of the waste water such as, e.g., portions of the waste water containing higher concentrations of liquid.

In the illustrated example, the preliminary separator 110 can provide the portion 112 of the waste water 109, containing primarily solid material, to a solid storage vessel 114. The preliminary separator 110 can provide a remaining portion 116 of waste water 109 to the separator system 104. The remaining portion 116 of the waste water can contain a lower concentration of solid material than the waste water 109 that entered the preliminary separator 110.

The separator system 104 can receive the portion 116 of waste water and can separate solids and liquids of the waste water using a combination of distillation and coagulation processes. The separator system 104 can provide solid and liquid portions 118, 120 of the waste water to the solid storage vessel 114 and a liquid storage vessel 122, respectively.

In some embodiments, the treatment system 100 can include sensors configured to monitor operating conditions of the treatment system 100. For example, the treatment system 100 can include flow meters, pressure gauges, temperature sensors, pH meters, etc. that can be positioned at various locations throughout the treatment system 100. The treatment system can also include various functional components configured to facilitate operation of the treatment system. For example, the treatment system 100 can include pumps, blowers, valves, and electro-coagulators. In some embodiments, the sensors and the functional components of the treatment system 100 can be monitored and/or controlled by a controller 124. For example, the controller 124 can monitor operating conditions provided by the sensors, and can adjust operation of the functional components to ensure that the operating values remain within desired limits.

Figure 2:
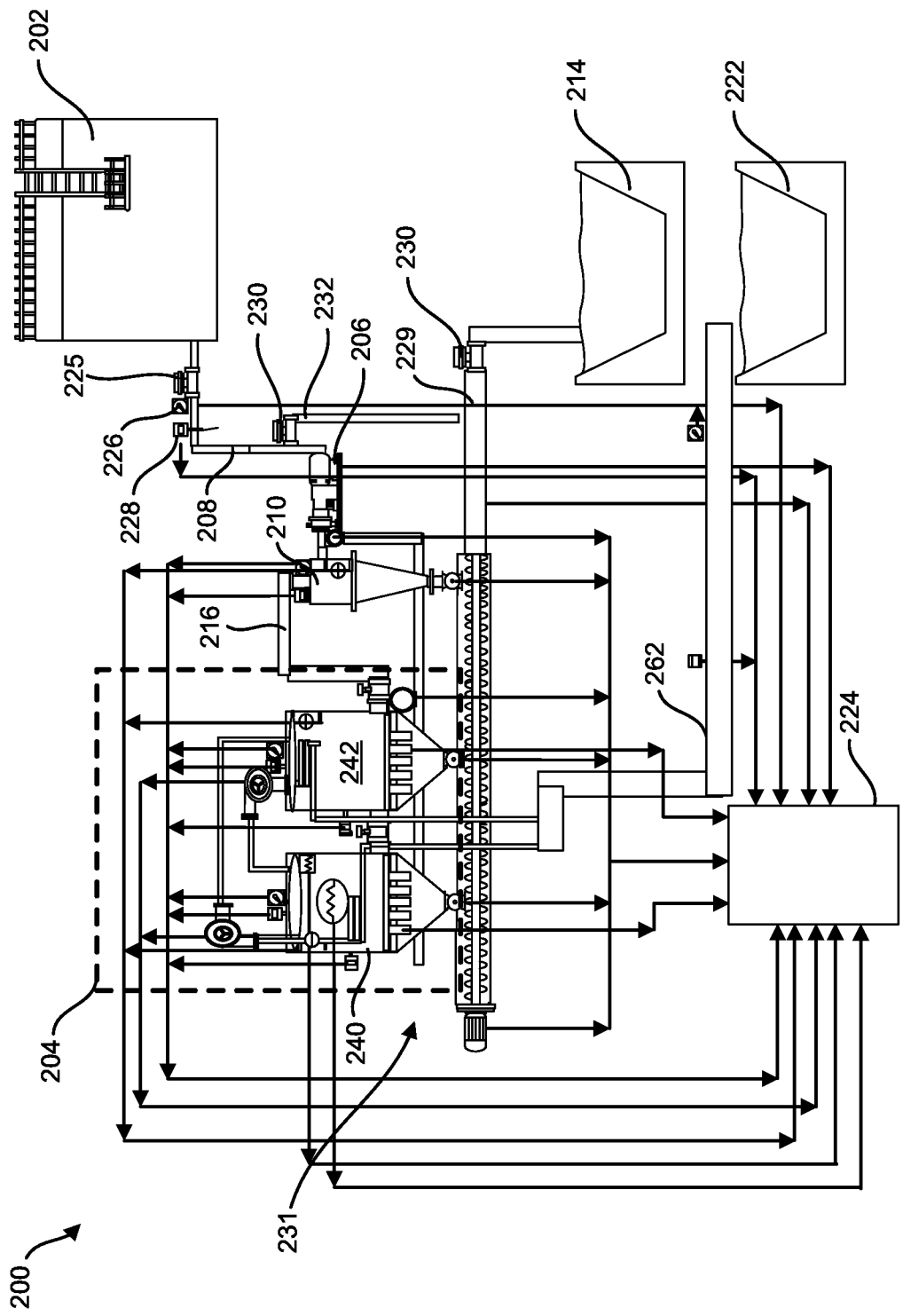
FIG. 2 is a detailed view of another exemplary embodiment of a treatment system that can be used to treat spent wash.

FIG. 2 shows a detailed view of an exemplary embodiment of a treatment system 200 that can be configured to treat waste water. As shown in FIG. 2, the treatment system 200 can include a digester 202, a pump 206, a preliminary separator 210, and a separator system 204 that includes a main separator vessel 240 and a secondary separator vessel 242. The digester 202 can be configured to process the waste water prior to delivery to the preliminary separator 210 and the separator system 204. For example, the digester 202 can be configured to cut solids within the waste water, and mix the waste water to ensure an even distribution of solid and liquid components. The pump 206 can be configured to receive waste water from the digester 202 and to provide the preliminary separator 210 and the separator system 204 with waste water to be treated. The preliminary separator 210 and the separator system 204 can be configured to separate the waste water mixture into solid and liquid portions, and provide the solid and liquid portions to a solids storage vessel 214 and a liquid storage vessel 222, respectively. In some embodiments, the treatment system 200 can include a controller 224 that can be configured to monitor sensor data and adjust operation of the treatment system 200 based on the sensor data, as described in more detail below.

As shown in FIG. 2, the treatment system 200 can include sensors such as, e.g., a flow meter 226 and a potential of hydrogen (pH) meter 228, positioned along a flow path 208 between the digester 202 and the pump 206. As described herein, flow paths (e.g., flow path 208) can be pipes, tubing, flow channels, or the like. The flow meter 226 can be configured to measure amounts and/or flow rates of waste water delivered to the pump 206. The pH meter 228 can be configured to measure a value of acidity of the waste water delivered to the pump 206. The treatment system 200 can also include a valve 225 positioned along the flow path 208 between the digester 202 and the pump 206. The valve 225 can be configured to control flow of waste water from the digester 202 to the pump 206.

In some embodiments, the treatment system 200 can include a pressure release valve 230 coupled to the flow path 208 between the digester 202 and the pump 206. The pressure release valve 230 can be configured to open automatically when pressure of the waste water between the digester 202 and the pump 206 exceeds a predetermined value. When the pressure release valve 230 is open, the flow path 208 can be in fluid communication with a pressure release flow path 232, thereby allowing waste water to flow from the flow path 208 between the digester 202 and the pump 206 to the pressure release flow path 232.

Figure 3:
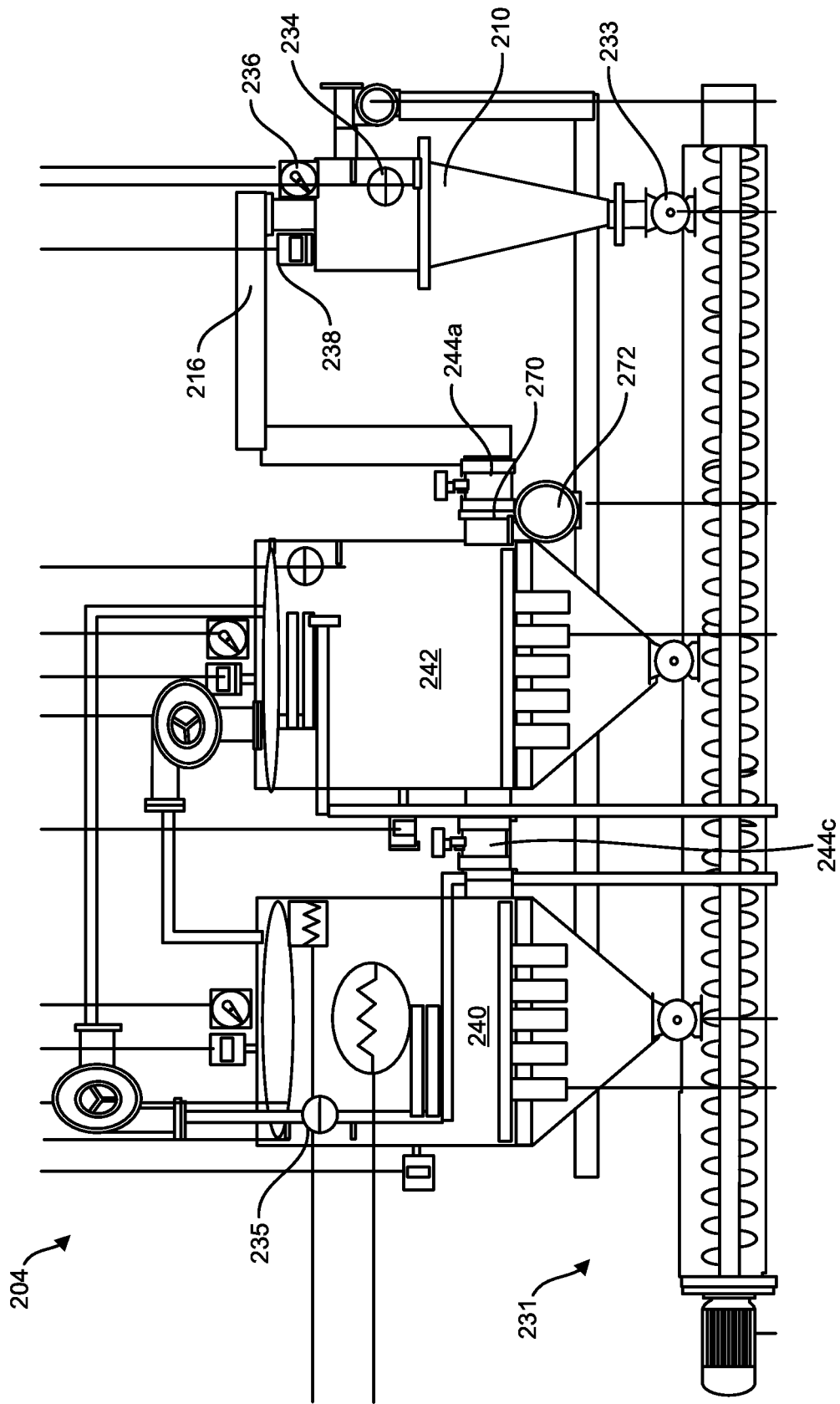
FIG. 3 is a magnified view of a preliminary separator and the a system of the treatment system shown in FIG. 2.

FIG. 3 shows a magnified view of the preliminary separator 210 and the separator system 204. The preliminary separator 210 functions to separate a portion of insoluble solid material from the waste water mixture. In some embodiments, the preliminary separator 210 can be configured to classify, separate, and/or sort solids in the waste water based on ratios of centripetal force to fluid resistance. In an exemplary embodiment, the preliminary separator 210 can be a hydrocyclone. As shown in FIG. 3, the preliminary separator 210 can include a level meter 234, a pressure gauge 236, and a temperature sensor 238. The level meter 234 can be configured to measure an amount of waste water that is within the preliminary separator 210. The temperature sensor 238 and pressure gauge 236 can be configured to measure a temperature and pressure of the waste water within the preliminary separator 210, respectively. In the illustrated example, the preliminary separator 210 can provide the portion of the waste water, which can primarily contain insoluble solid material, to a pump (e.g., an auger or a screw) 231. In some embodiments, the preliminary separator 210 can include a valve 233 (e.g., a ball valve) that can be configured to control flow from the preliminary separator 210 to the pump 231. The valve 233 can be in electronic communication with the controller 224 such that the controller 224 can control operation of the valve 233. The pump 231 can provide the solid material to a compression unit 229, which can be configured to compress the solid waste and deliver it to the solids storage vessel 214. In some embodiments, a pressure release valve 230 can be positioned between the compression unit 229 and the solids storage vessel 214, as shown in FIG. 2.

The pressure release valve 230 can be configured to open automatically when the solid material has been compressed to a predetermined pressure within the compression unit 229. The preliminary separator 210 can provide a remaining portion of waste water to the separator system 204 via another flow path 216. A valve 244a can be positioned between the preliminary separator 210 and the separator system 204. The valve 244a can be coupled to an inlet 270 of the secondary separator vessel 242 and can be configured to control flow of the waste water mixture between the preliminary separator 210 and the separator system 204. In some embodiments, a blower 272 can be coupled to the secondary separator vessel 242 adjacent to the inlet 270.

The separator system 204 system can be configured to separate liquid and solid portions of the waste water using a combination of distillation and electrocoagulation (EC) processes. In the illustrated example, the separator system 204 includes the main separator vessel 240 and the secondary separator vessel 242. The secondary separator vessel 242 can be configured to receive the waste water mixture from the preliminary separator 210. The secondary separator vessel 242 can be in fluid communication with the main separator vessel 240. A valve 244c can be positioned between the main separator vessel 240 and the secondary separator vessel 242. The valve 244c can be configured to control flow of the waste water mixture between the main separator vessel 240 and the secondary separator vessel 242. Therefore, waste water delivered to the secondary separator vessel can also flow into the main separator vessel 240. The secondary separator vessel 242 is discussed in more detail below.

Figure 4:
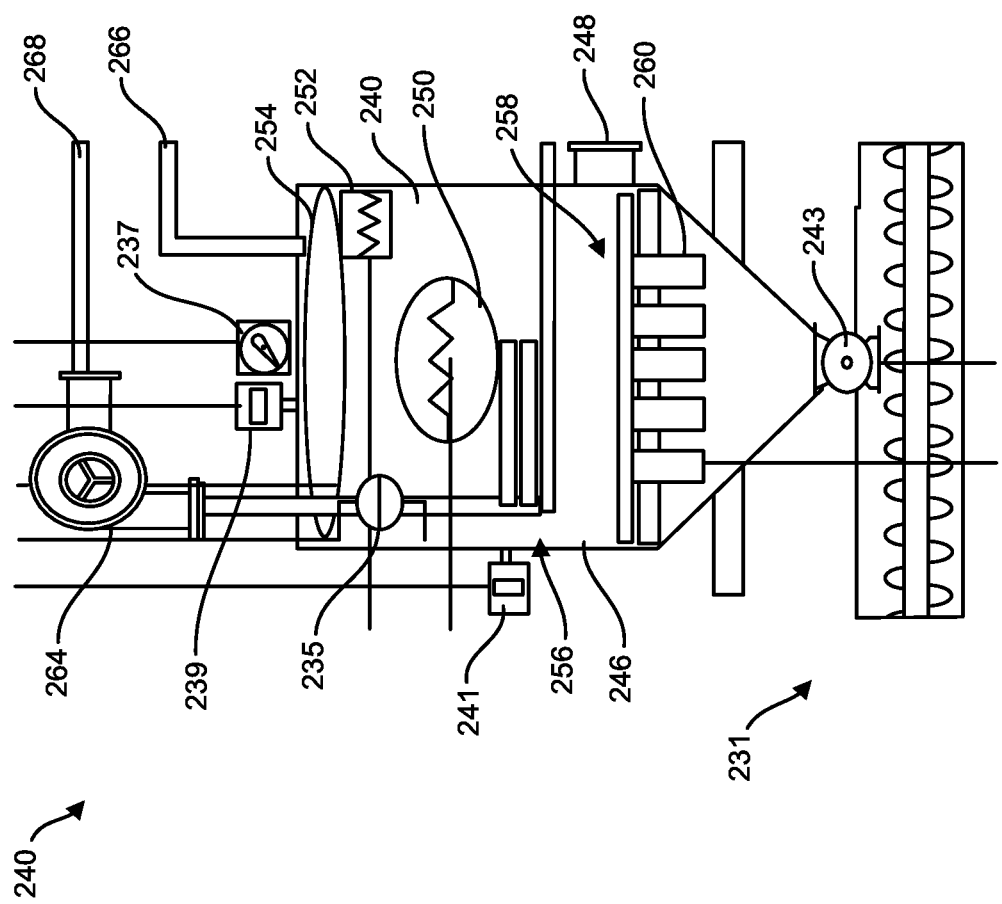
FIG. 4 is a magnified view of a main separator vessel of the treatment system shown in FIG. 2.

FIG. 4 shows a magnified view of the main separator vessel 240. As shown in the illustrated example, the main separator vessel 240 can include a body 246 that can be configured to receive the waste water mixture from the secondary separator 242 via an inlet 248. The inlet 248 can be coupled to the valve 244c, as shown in FIGS. 3-4. The body 246 of the main separator vessel 240 can also include a heating element 250, a magnetron 252, a demister 254, a condenser 256, and an electrocoagulation (EC) unit 258.

The heating element 250 and the magnetron 252 can be configured to heat the waste water mixture that is within the body 246 such that a liquid portion of the waste water evaporates. For example, in some embodiments, the heating element 250 can be configured to generate heat and to transfer at least a portion of the heat to the waste water mixture such that a portion of the waste water mixture evaporates. In some embodiments, the heating element 250 can be, e.g., sourced from another industrial process located within or near the waste water processing system 204. For example, an output stream of an oil refinery process that needs to be cooled can be cycled through the waste water processing system 204 and used as a heat source. In some embodiments, the heating element 250 can include electrical heating elements (e.g., having a high resistance such that electrical current passing through the heating element 250 causes the temperature of the heating element 250 to increase).

In some implementations, the heating element 250 can include other means for heating. For example, the heating element 250 can include pipes circulating high or low temperature liquid, such as is produced by industrial waste processes and/or by a gas furnace. In some embodiments, a heating source can include industrial processes and/or a gas furnace, and can provide the liquid to the heating element 250. In other embodiments, the heating element 250 can include a layer of infrared absorbing material and the heating source can include an infrared source located such that infrared light impinges the heating elements 250. The impinging infrared light can cause the temperature of the heating element 250 to rise. In some implementations, solar light can be used as the heating source. In other implementations, heating the elements 250 can include a layer of electromagnetic absorbing material and heating source 140 can include an electro-magnetic generator located within vessel 105.

The magnetron 252 can be configured to generate microwaves and direct at least a portion of the microwaves at the waste water mixture within the body 246. In some embodiments, microwaves generated by the magnetron 252 can heat the waste water mixture as well as vapor formed from the waste water mixture. As an example, the magnetron 252 can be, or can include, a vacuum tube configured to generate microwaves using interactions between a stream of electrons and a magnetic field. The electrons can pass by opening in metal cavities of the magnetron 252, which can cause radio waves, including microwaves, to oscillate within the cavities. The frequency of the microwaves that are generated is determined by physical dimensions of the cavities. The heating element 250 and the magnetron 252 can be in electronic communication with the controller 224. The controller 224 can provide electric power to, and control operation of, the heating element 250 and the magnetron 252.

The condenser 256 can be configured to receive a vapor such as, e.g., vapor formed from waste water within the secondary separator vessel 242, condense the vapor to form a liquid, and deliver the liquid to the liquid storage vessel 222 via a flow path 262 (shown in FIG. 2). In some embodiments, a blower 264 in fluid communication with the condenser 256 can pump the vapor from the secondary separator vessel 242 to the condenser 256 via a flow path 268. Heat can be extracted from the vapor within the condenser 256 such that the vapor condenses to form the liquid. The heat extracted from the vapor within the condenser can be transferred to the waste water mixture within the main separator vessel 240 and/or to the vapor formed from the waste water mixture within the main separator vessel 240.

The demister 254 can be positioned above a predetermined maximum level, or height, of the waste water mixture within the body 246. The demister 254 can be configured to remove liquid droplets entrained in vapor formed from the waste water mixture. As an example, the demister 254 can be a mesh-type coalesce, vane pack, or other structure configured to aggregate entrained liquid into droplets such that the entrained liquid can be separated from the vapor. Droplets captured by the demister can drop down toward the EC unit 258 to recombine with the waste water mixture, including liquids and solids, within the main separator vessel 240. Vapor generated within the main separator vessel 240 can be provided to a condenser 257 of the secondary separator vessel via a flow path 266.

The EC unit 258 can be configured to remove suspended solids and emulsified oils from the waste water mixture. The EC unit 258 can include a number of EC cells 260 that enable removal of suspended solids from the waste water mixture. The EC cells 260 can also function to breakdown emulsions, and oxidize and eradicate of heavy metals from the waste water mixture. Each EC cell 260 can include an anode and a cathode. The EC unit 258, including the EC cells 260, can be coupled to the controller 224, which include a direct current power source. The controller 224 can apply a voltage differential between the anode and the cathode such that the cathode is negatively charged. This voltage differential can cause oxidation of the anode such that metal ions (e.g., cations) can be ejected from the anode into the waste water. The metal ions can neutralize charges of particles within the waste water mixture, thereby causing coagulation. A magnitude of the voltage differential can also determine a rate of oxidation of the anode, thereby determining rate of coagulation particles within the waste water mixture. For example, the metal ions can enable removal of undesirable contaminants by chemical reaction and precipitation, and/or by causing colloids within the waste water mixture to coalesce. Additionally, on the surface of the cathode, water within the waste water mixture can be hydrolyzed into hydrogen gas and hydroxide ions. Electrons can flow freely to destabilize surface charges on suspended solids and emulsified oils within the waste water mixture. The metal ions can combine with the hydroxide ions to form polymeric metal hydroxides, which can function as coagulants. The metal hydroxides can trap suspended solids and emulsified oils within the waste water mixture.

In the illustrated example, the main separator vessel 240 can deliver the coagulated contaminants to the pump 231. As shown in FIG. 4, the main separator vessel 240 can include a valve 243 (e.g., a ball valve) that can be configured to control flow from the main separator vessel 240 to the pump 231. The valve 243 can be in electronic communication with the controller 224 such that the controller 224 can control operation of the valve 243. The pump 231 can be configured to deliver the coagulated contaminants to the compression unit 229 (shown in FIG. 2). The compression unit 229 can compress the coagulated contaminants and deliver the compressed coagulated contaminants to the solids storage vessel 214.

As shown in FIGS. 3-4, the main separator vessel 240 can also include a pressure gauge 237, temperature sensors 239, 241, and a level meter 235. The pressure gauge 237 can be configured to measure pressure of the waste water mixture and/or vapor within the main separator vessel 240. The temperature sensors 239, 241 can be configured to measure temperatures within the main separator vessel 240. The level meter 235 can be configured to measure an amount of waste water that is within the main separator vessel 240. The pressure gauge 237, temperature sensors 239, 241, and the level meter 235 can be electrically coupled to the controller 224. The pressure gauge 237, temperature sensors 239, 241, and the level meter 235 can be configured to provide data to the controller 224. The controller 224 can be configured to monitor data from the pressure gauge 237, temperature sensors 239, 241, and the level meter 235.

Figure 5:
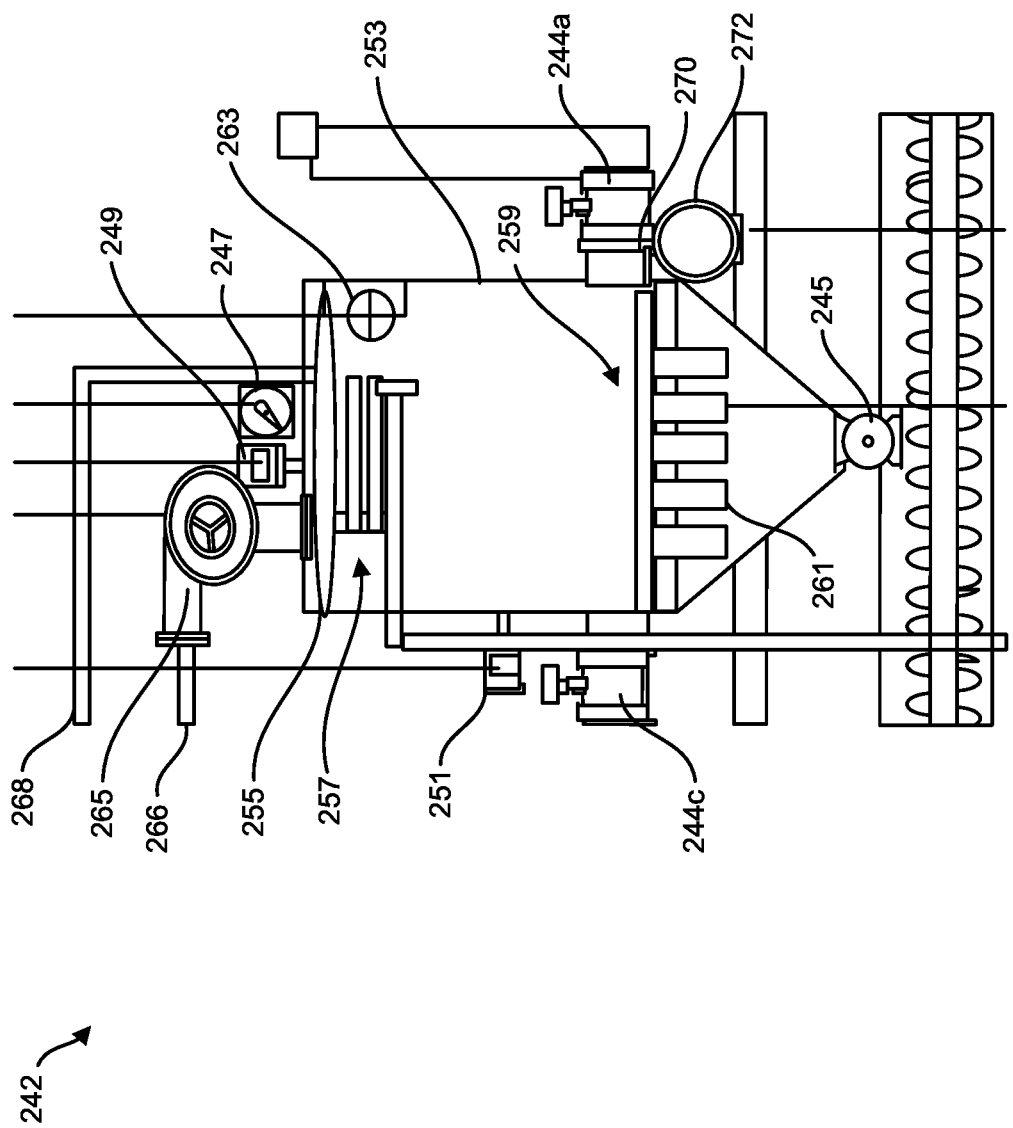
FIG. 5 is a magnified view of a secondary separator vessel of the treatment system shown in FIG. 2.

During operation, vapor from the waste water mixture in the main separator vessel 240 can be delivered to the secondary separator vessel 242 via a flow path 266. FIG. 5 shows a magnified view of the secondary separator vessel 242. As shown in the illustrated example, the secondary separator vessel 242 can include a body 253. The body 253 can be in fluid communication with the main separator vessel 240 and the preliminary separator 210. The body 253 of the secondary separator vessel 242 can include a condenser 257, an EC unit 259, and a demister 255.

A blower 265 can draw vapor from the main separator vessel 240 via the flow path 266 and can provide the vapor to the condenser 257. The condenser 257 can be configured to receive vapor from the main separator vessel 240, condense the vapor to form a liquid, and deliver the liquid to the liquid storage vessel 222 via a flow path 262 (shown in FIG. 2). Heat can be extracted from the vapor within the condenser 257 such that the vapor condenses to form the liquid. The heat extracted from the vapor within the condenser 257 can be transferred to the waste water mixture within the secondary separator vessel 242 and/or to the vapor formed from the waste water mixture within the secondary separator vessel 242. Heat delivered to the waste water within the secondary separator vessel 242 can cause a portion of the waste water to evaporate. As mentioned above, the blower 264, shown in FIGS. 3-4, can pump vapor from the secondary separator vessel 242 to the condenser 256 in the primary separator vessel via flow path 268.

The EC unit 259 can generally function similarly to the EC unit 258, as described herein. The EC unit 259 can be configured to remove suspended solids and emulsified oils from the waste water mixture. The EC unit 259 can include a number of EC cells 261 that facilitate removal of suspended solids from the waste water mixture. The EC cells 261 can also function to breakdown emulsions, and oxidize and eradicate heavy metals from the waste water mixture, as described above with regard to the EC cells 260. In the illustrated example, the secondary separator vessel 242 can deliver coagulated contaminants to the pump 231. As shown in FIG. 5, the secondary separator vessel 242 can include a valve 245 (e.g., a ball valve) that can be configured to control flow from the secondary separator vessel 242 to the pump 231. The valve 245 can be in electronic communication with the controller 224 such that the controller 224 can control operation of the valve 245. The pump 231 can be configured to deliver the coagulated contaminants to the compression unit 229 (shown in FIG. 2). The compression unit 229 can compress the coagulated contaminants and deliver the compressed coagulated contaminants to the solids storage vessel 214.

As shown in FIG. 5, the secondary separator vessel 242 can also include a pressure gauge 247, temperature sensors 249, 251, and a level meter 263 that can be coupled to the body 253. The pressure gauge 247 can be configured to measure pressure of the waste water mixture and/or vapor within the secondary separator vessel 242. The temperature sensors 249, 251 can be configured to measure temperatures within the secondary separator vessel 242. The level meter 263 can be configured to measure an amount of waste water that is within the secondary separator vessel 242. The pressure gauge 247, temperature sensors 249, 251, and the level meter 263 can be electrically coupled to the controller 224. The pressure gauge 247, temperature sensors 249, 251, and the level meter 263 can be configured to provide data to the controller 224. The controller 224 can be configured to monitor data from the pressure gauge 247, temperature sensors 249, 251, and the level meter 263.

In some implementations, a mixture of gases can be collected from the process and/or reused. For example, for a gas collection unit, chemical tank, and/or fuel for a boiler.

In some implementations, a bacterial removal unit can be included downstream from the hydrocyclone 210. The bacterial removal unit can process the stream to remove bacteria, for example, via ultraviolet light or another means.

Figure 6:
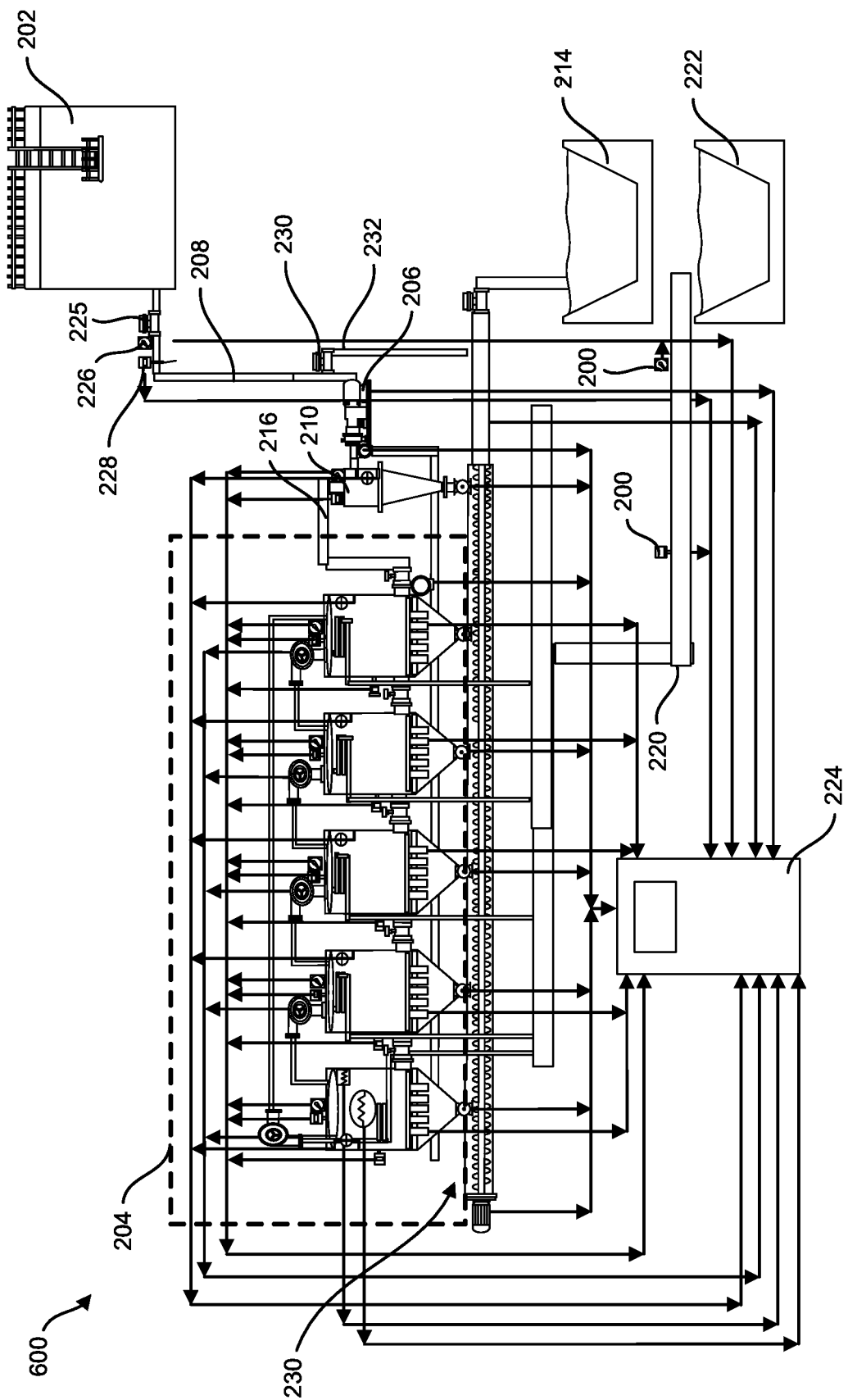
FIG. 6 illustrates another example implementation of a waste water treatment system.
Figure 7:
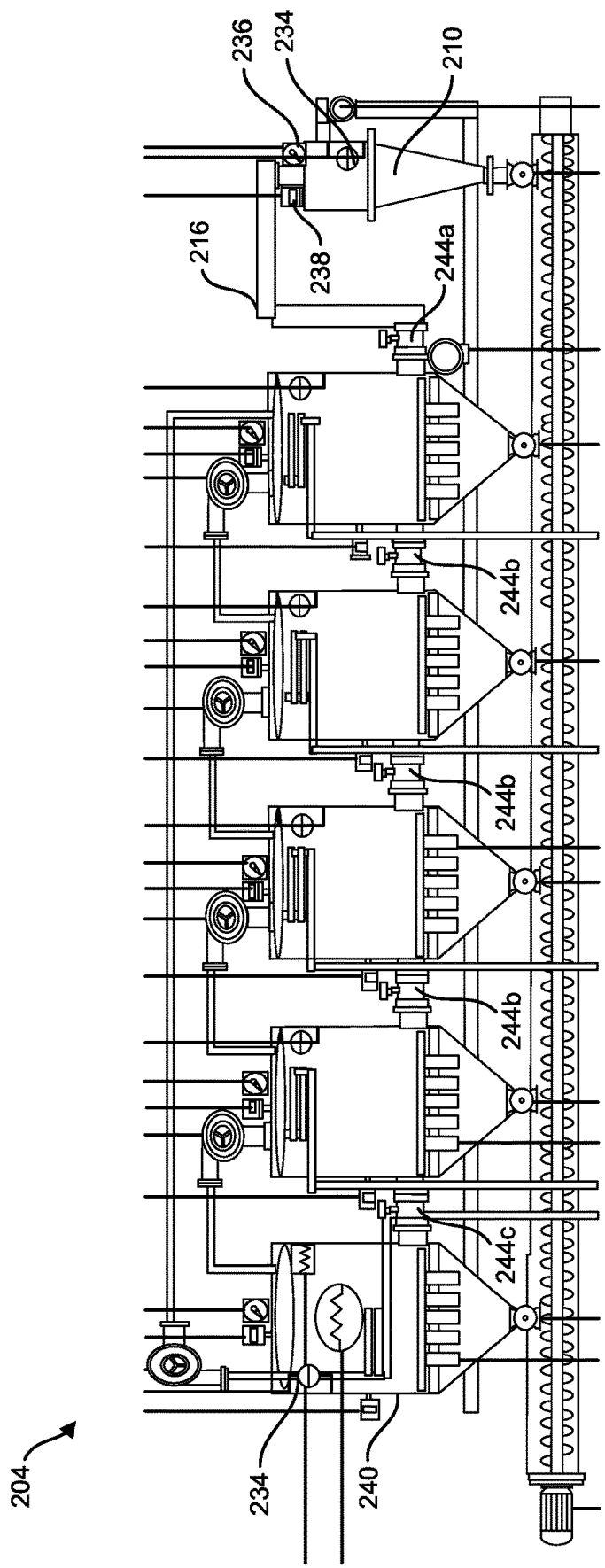
FIG. 7 illustrates an expanded view of the separator system with four separators.

FIG. 6 illustrates another example implementation of a waste water treatment system 600. In this example implementation, the waste water treatment system 600 includes four secondary separators cascaded for improved efficiency. FIG. 7 illustrates an expanded view of the separator system 204 with four secondary separators.

The separator system 204 system can be configured to separate liquid and solid portions of the spent wash using a combination of distillation and electrocoagulation (EC) processes. In the illustrated example, the separator system 204 includes a main separator vessel 240 and a series of secondary separator vessels 242a, 242b, 242c, 242d. The main separator vessel 240 can be fluidly coupled to the series of secondary separator vessels 242a, 242b, 242c, 242d. Each of the secondary separator vessels 242a, 242b, 242c, 242d can be in fluid communication with adjacent secondary separator vessels 242a, 242b, 242c, 242d. Valves 244b can be positioned between each of the secondary separator vessels 242a, 242b, 242c, 242d. The valves 244b can be configured to control flow of the spent wash mixture between the secondary separator vessels 242a, 242b, 242c, 242d. A valve 244c can be positioned between the main separator vessel 240 and the adjacent secondary separator vessel 242a. The valve 244c can be configured to control flow of the spent wash mixture between the main separator vessel 240 and the secondary separator vessels 242.

FIG. 8 is a table illustrating specifications for an example implementation according to some aspects of the current subject matter. The table of FIG. 8 lists some mechanical, electrical, and electronic components to implement an exemplary treatment system with five separator vessels (e.g., a main separator and four secondary separators) according to some aspects of the current subject matter and exemplary specifications for each part. For example, the separator vessels (listed as purifier) may be made from a mild steel material, each suction blower may have a flow rate capacity of 30 to 40 m³/hr, and the heating element may each have an output power of 5 kW. The present disclosure is not limited to this exemplary specifications, and the treatment system may be designed based on various design considerations such as treatment capacity, types of liquid and solid materials for treatment, and the like.

In some implementations, separator vessels can be arranged similar to those described in US Publication No. 2018/0134578 published May 18, 2018, the entire contents of which is hereby expressly incorporated by reference herein.

The subject matter described herein is not limited to application within molasses or spent wash facilities, and but can be applied to any liquid waste with high BOD and/or COD, such as oil and gas refineries. Additional example applications can include in the areas of acid mine drainage, ballast water, bathroom waste, blackwater (coal), blackwater (waste), boiler blowdown, brine, combined sewer, cooling tower, cooling water, fecal sludge, greywater, infiltration/inflow, industrial effluent, ion exchange, leachate, manure, papermaking, return flow, reverse osmosis, sanitary sewer, septage, sewage, sewage sludge, urban runoff, and the like.

Further, the current subject matter can include any number of cascaded separators, such as 2, 3, 4, 5, 6, 7, 8, 9, 10, or more. Herein, reference of each separator does not describe the order of the separators or the upstream-downstream relationship of the separators. For example, the secondary separator may be referred to as a first separator, and the main separator may be referred to as a second separator. For a configuration with any number of cascaded separators, the system can include a total of n separators (n being a natural number; n≥2), wherein, for an i-th separator (i being any natural number; 2≤i≤n), the i-th separator is in communication with the (i−1)-th separator, the i-th separator configured to receive an i-th portion of the waste water from the (i−1)-th separator and to separate the i-th portion of the waste water into an i-th vapor and an i-th solid material, the i-th separator including an i-th condenser and an i-th electrocoagulation unit. The n-th separator can include a heating element configured to generate heat and transfer the heat to the n-th portion of the waste water, wherein heat from the (n−1)-th vapor and heat from the heating element cause at least a portion of the n-th portion of waste water to evaporate, thereby forming the n-th vapor within the n-th separator. Additionally or alternatively, the n-th separator can further include a magnetron configured to generate microwaves and direct at least a portion of the microwaves at the n-th portion of the waste water within the n-th separator, thereby heating the n-th portion of the waste water. At least one or all of the first to the n-th separators can include a demister configured to remove liquid droplets entrained within vapor.

Figure 9:
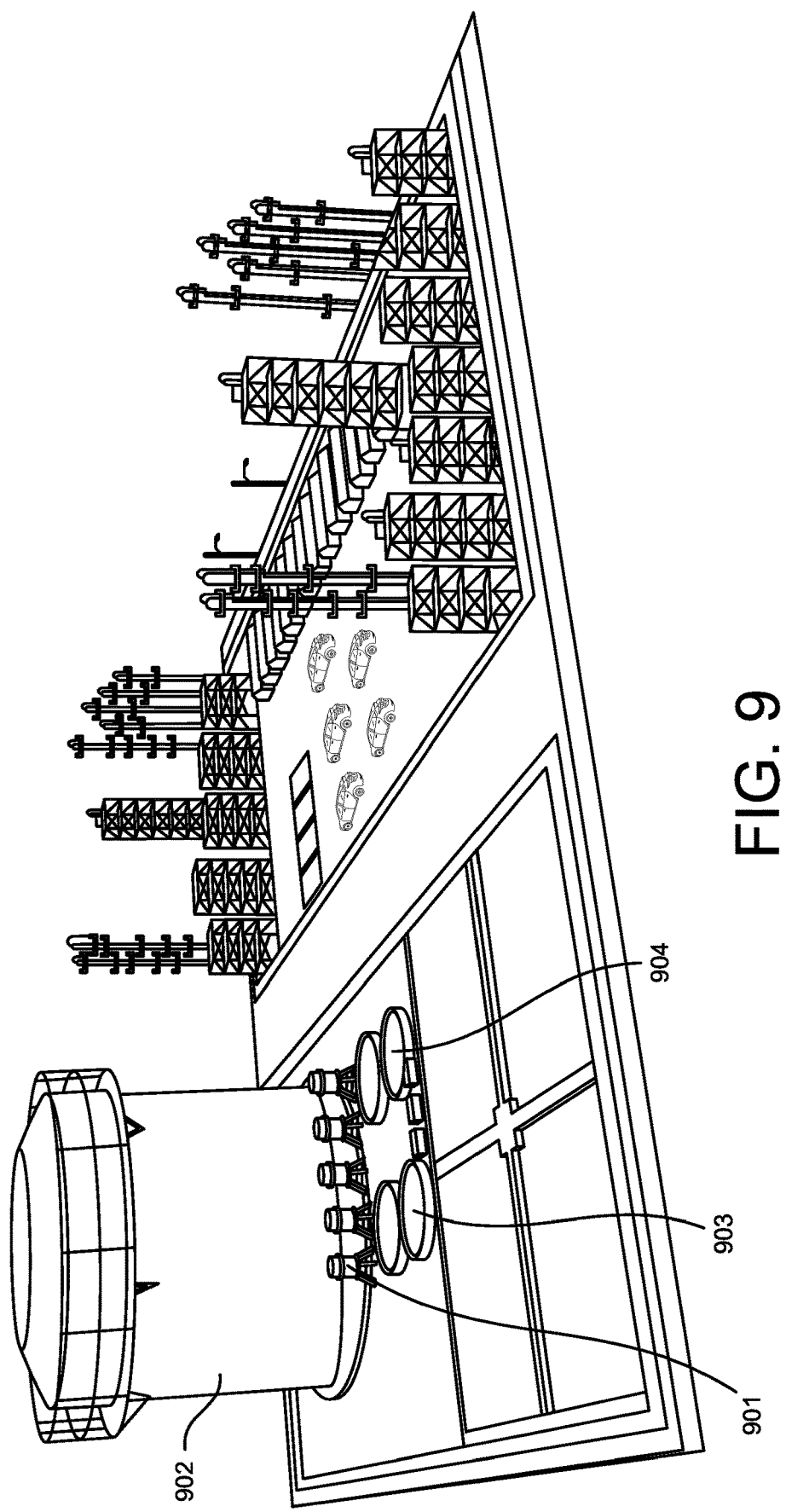
FIGS. 9-12 illustrate an example implementation of the current subject matter implemented at an oil refinery facility.
Figure 10:
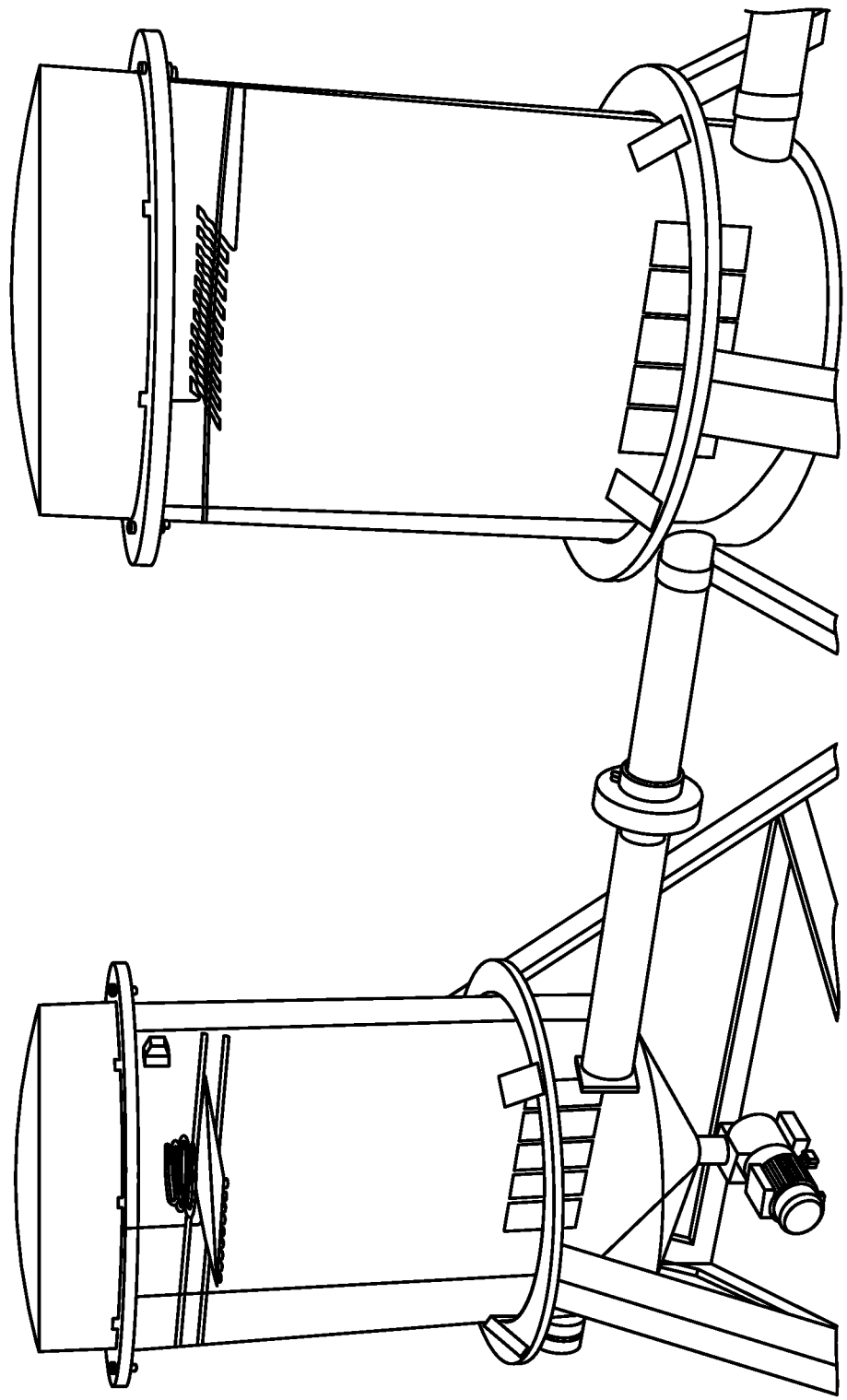
Figure 11:
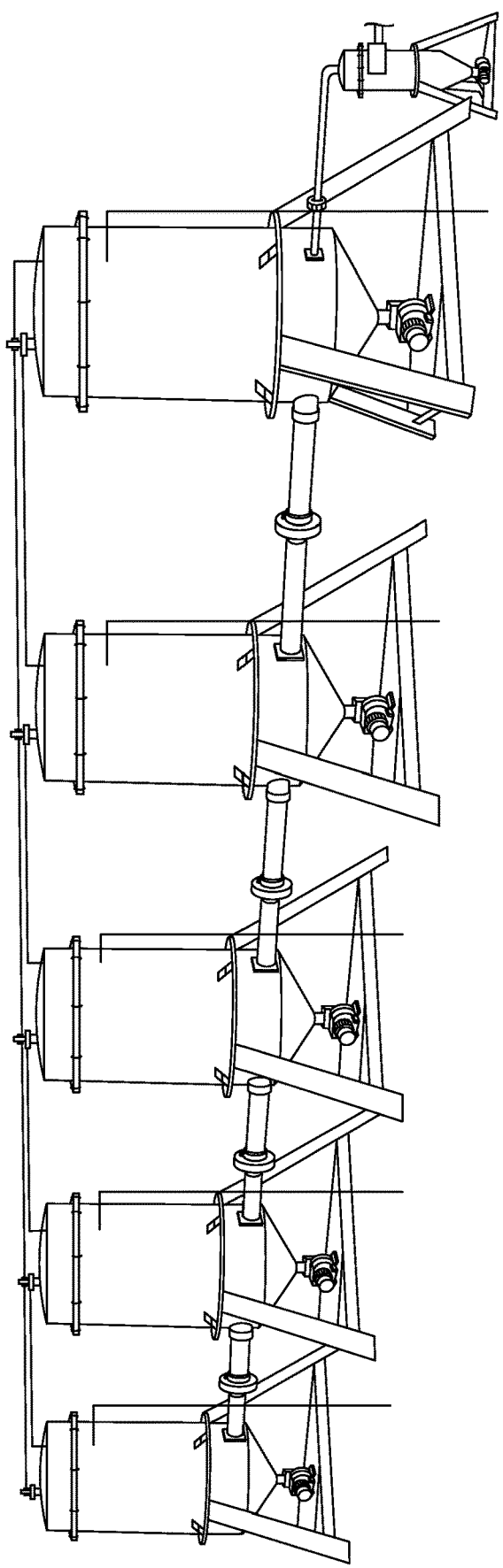
Figure 12:
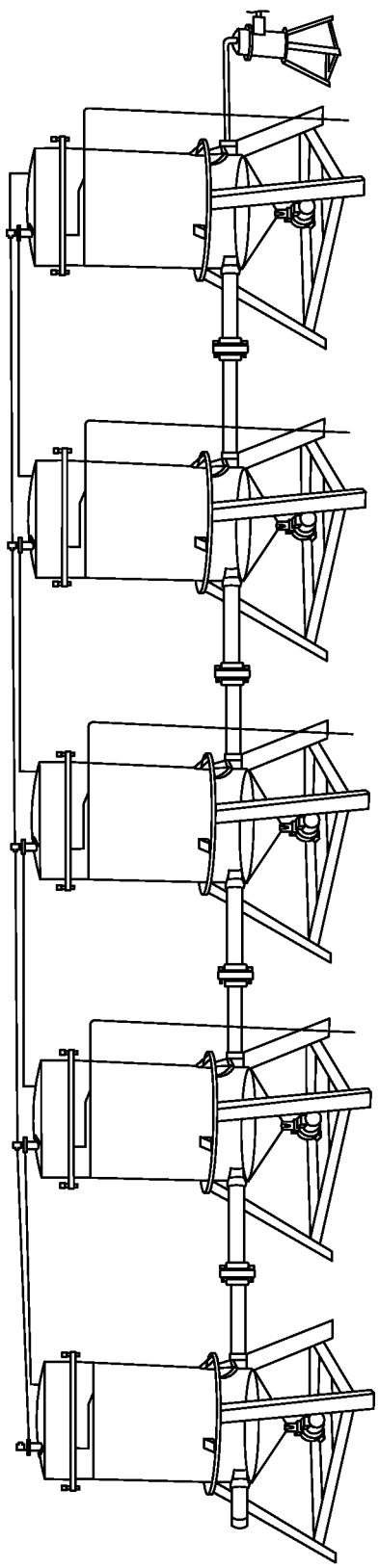

FIGS. 9-12 illustrate an example implementation of the current subject matter implemented at an oil refinery facility. FIG. 9 shows an overview of an example implementation of the waste water treatment system according to the present disclosure. Referring to FIG. 9, five separator vessels 901 may be disposed in the vicinity of the digester 902. The waste water supplied from the digester 902 may be treated and separated in the separator vessels 901. After the treatment, solid and the liquid portions may be stored in a solid storage vessel 903 and a liquid storage vessel 904, respectively. FIG. 10 is a magnified view of the separator vessels showing internal components for illustration purposes. FIGS. 11 and 12 show the separator vessels, their support systems, and fluid connection lines from two different viewing angles.

Figure 13:
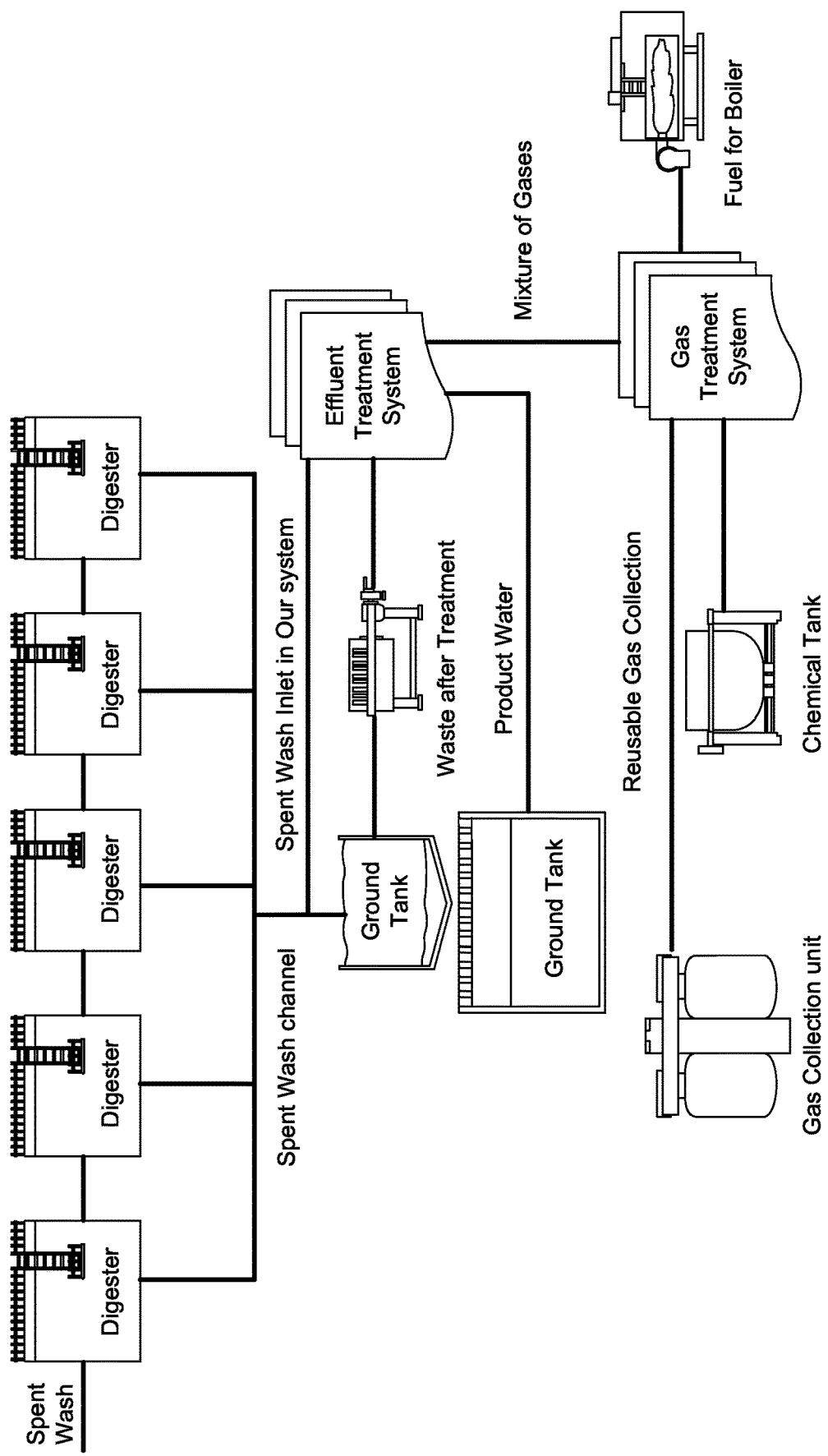
FIG. 13 is a process flow diagram illustrating that multiple digesters can provide the waste water, such as spent wash, to a ground tank, which can be input to a waste water treatment system according to the current subject matter.

FIG. 13 is a process flow diagram illustrating that multiple digesters can provide the waste water, such as spent wash, to a ground tank, which can be input to a waste water treatment system according to the current subject matter. The output of the system can include product water as well as a mixture of gases, that can be collected and/or reused, for example via a gas collection unit, chemical tank, and/or fuel for a boiler.

Figure 14:
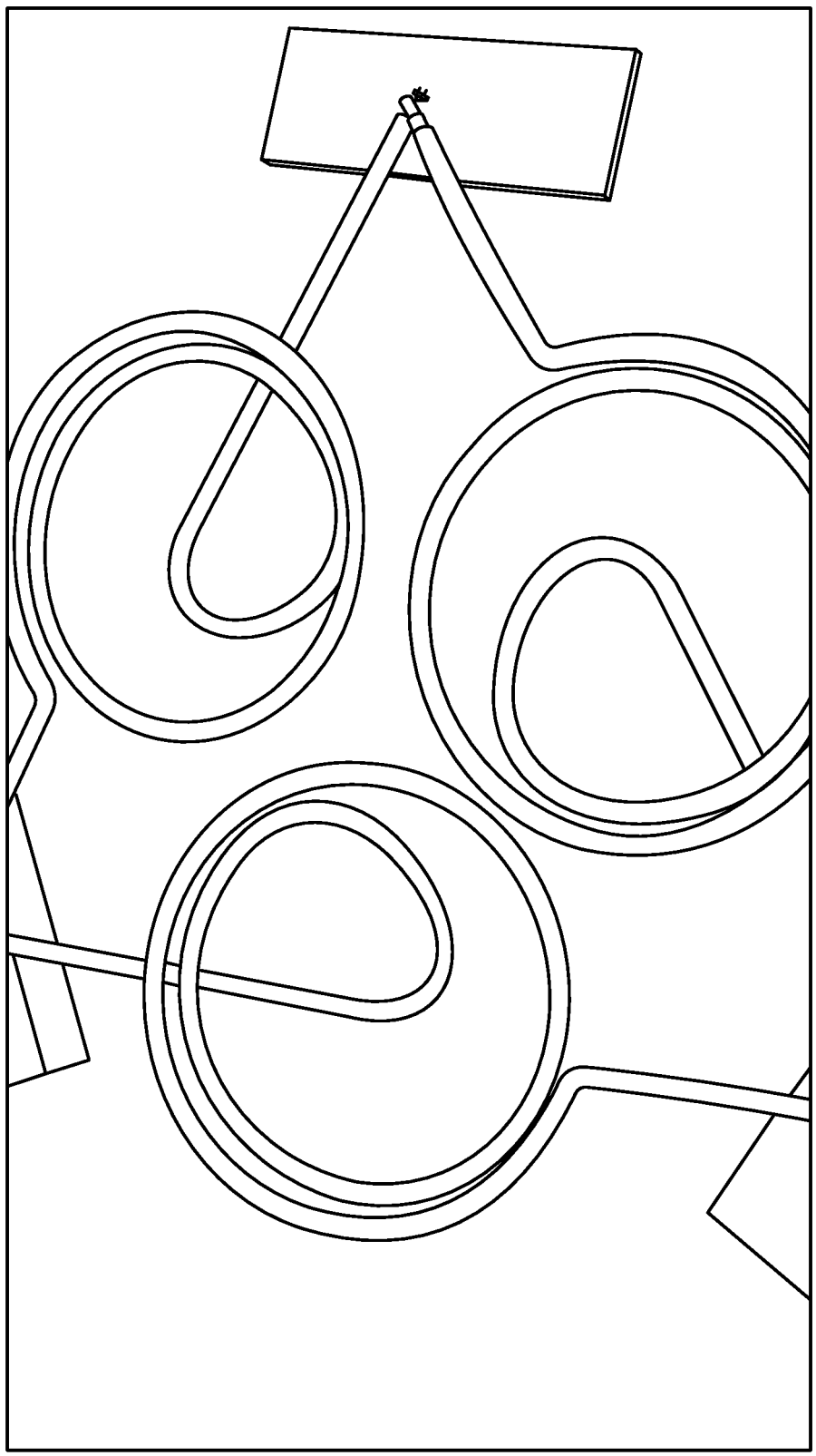
FIGS. 14-16 illustrate example heating elements and related dimensions according to an example implementation.
Figure 15:
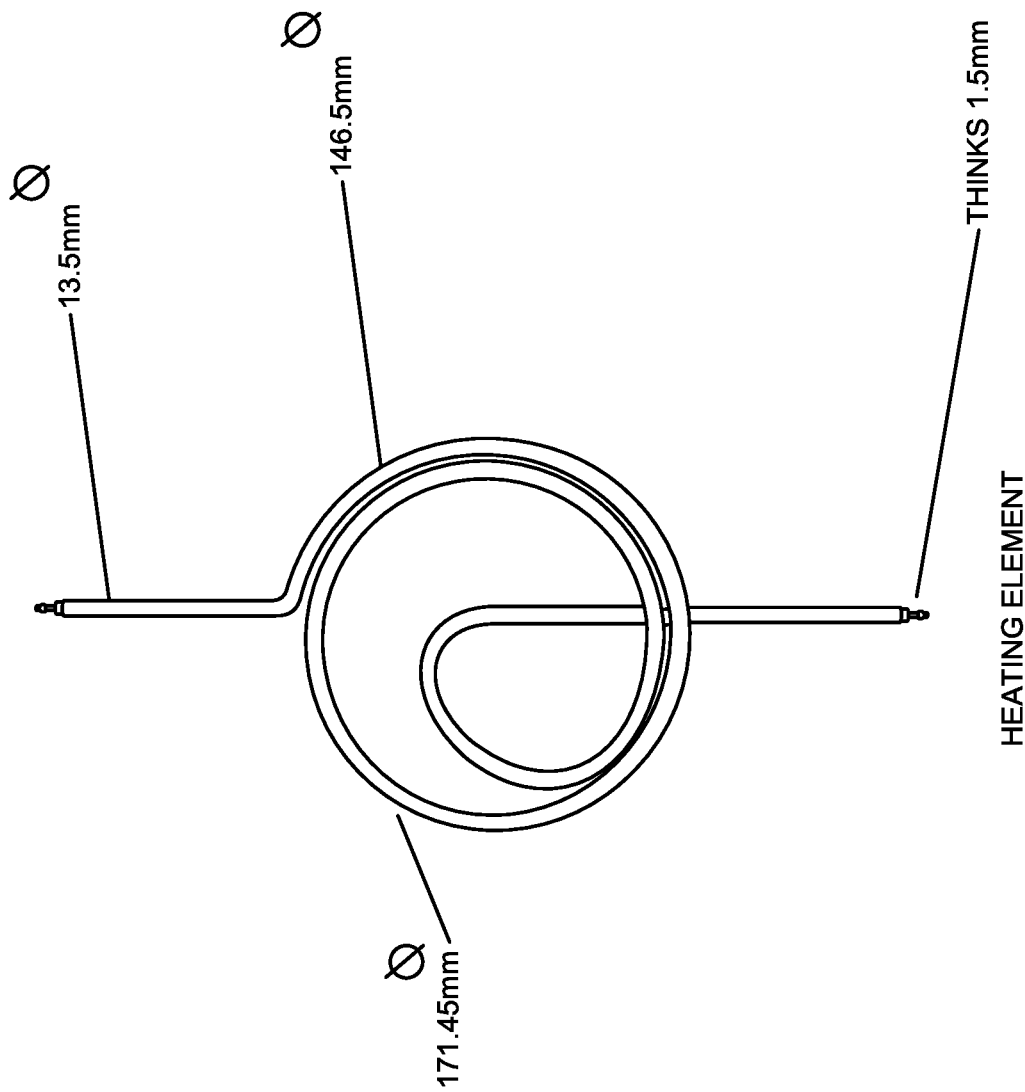
Figure 16:
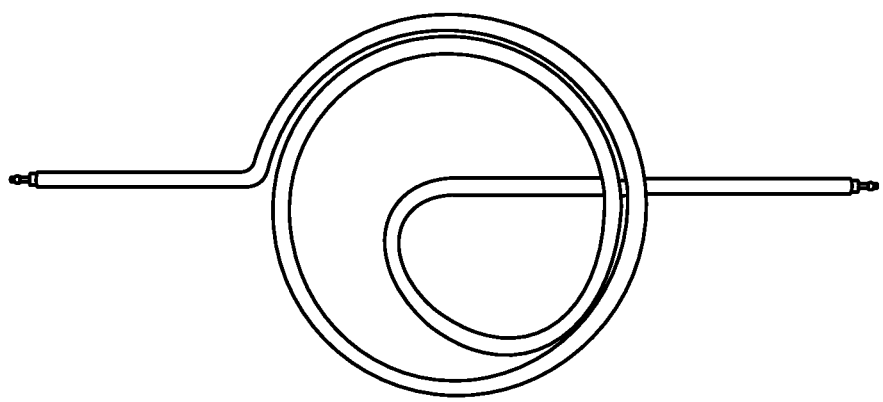
Figure 17:
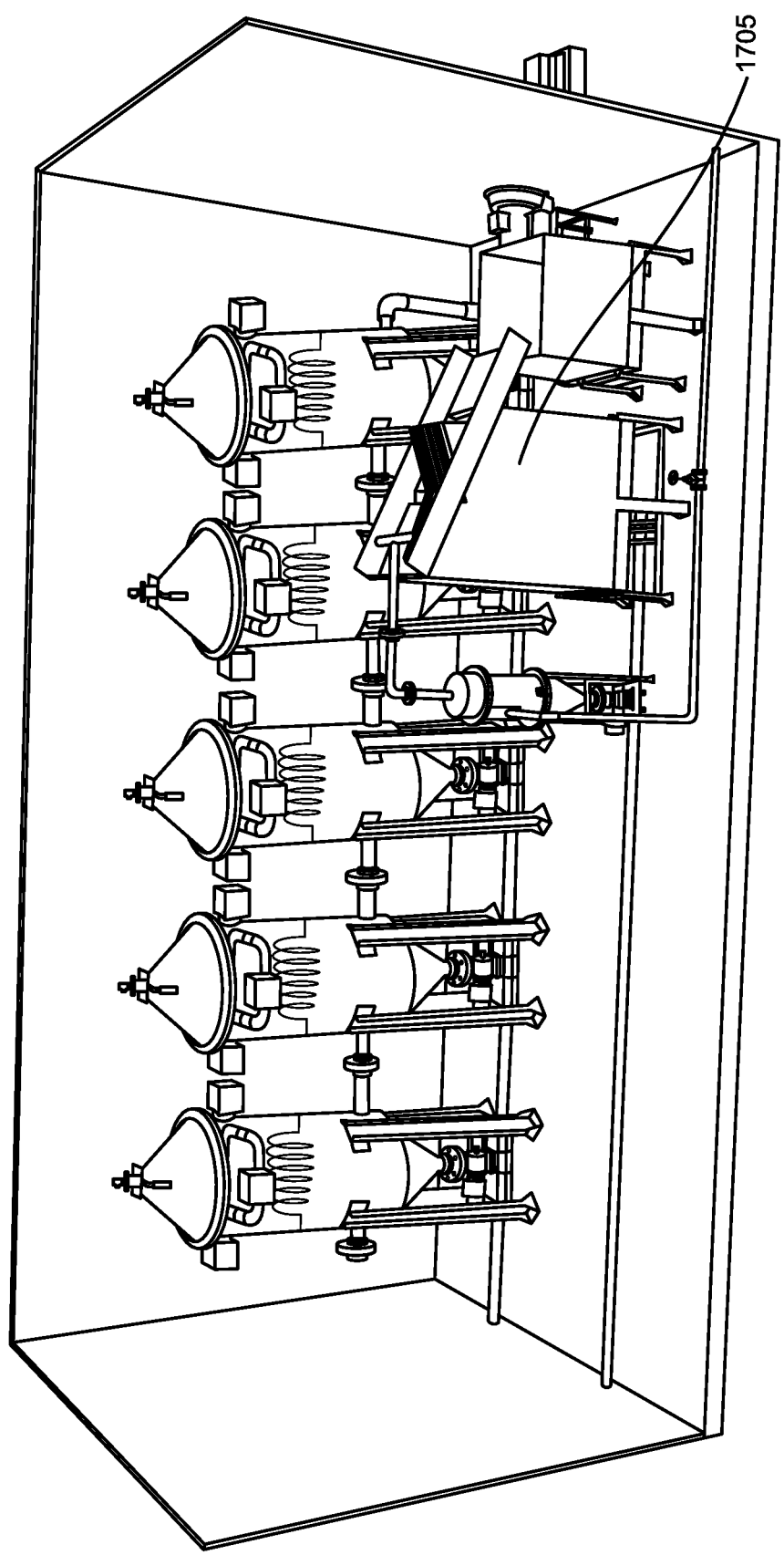
FIGS. 17-21 illustrate a modular processing system, which can be scaled to any required processing capabilities by adding additional units.
Figure 18:
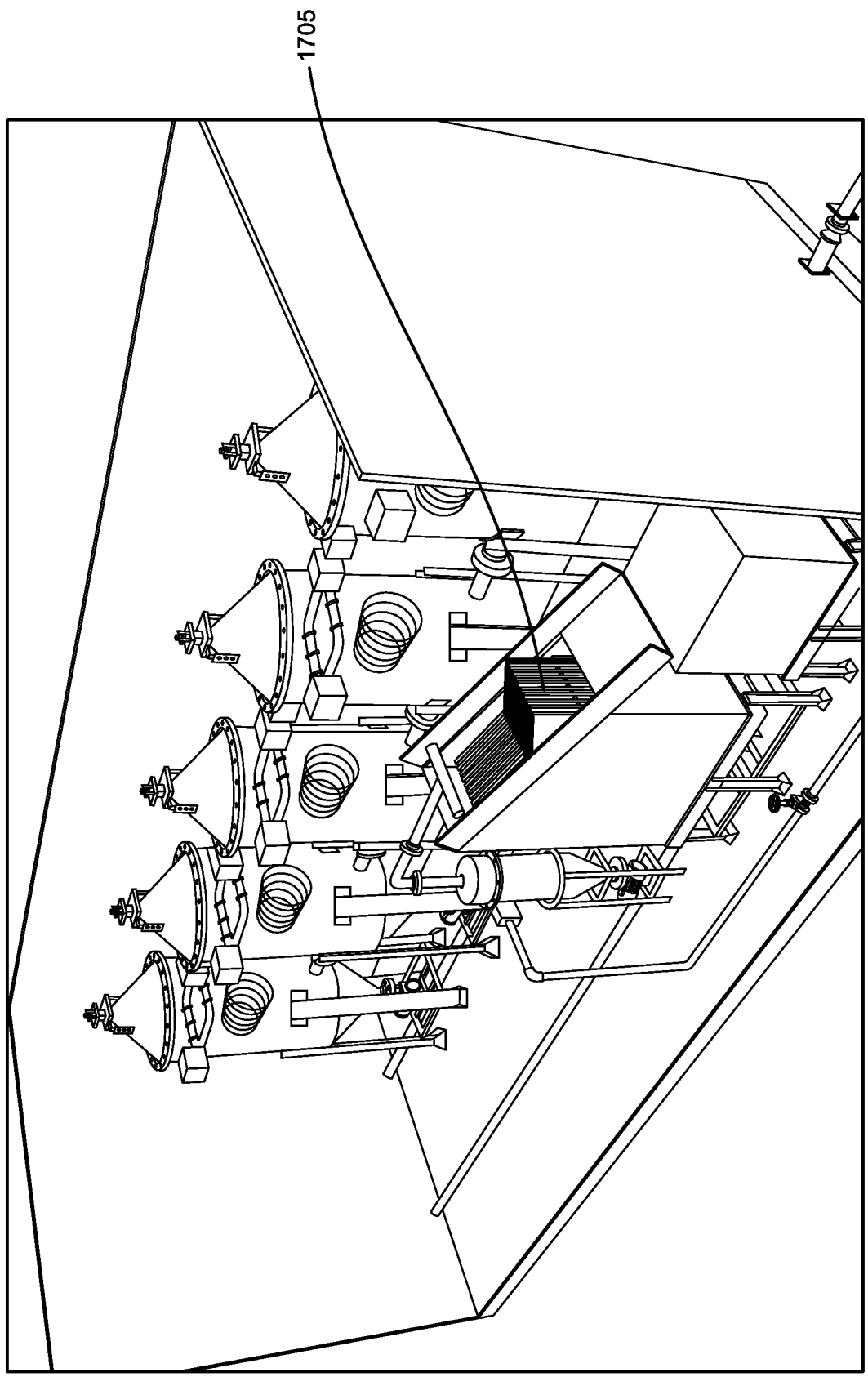
Figure 19:
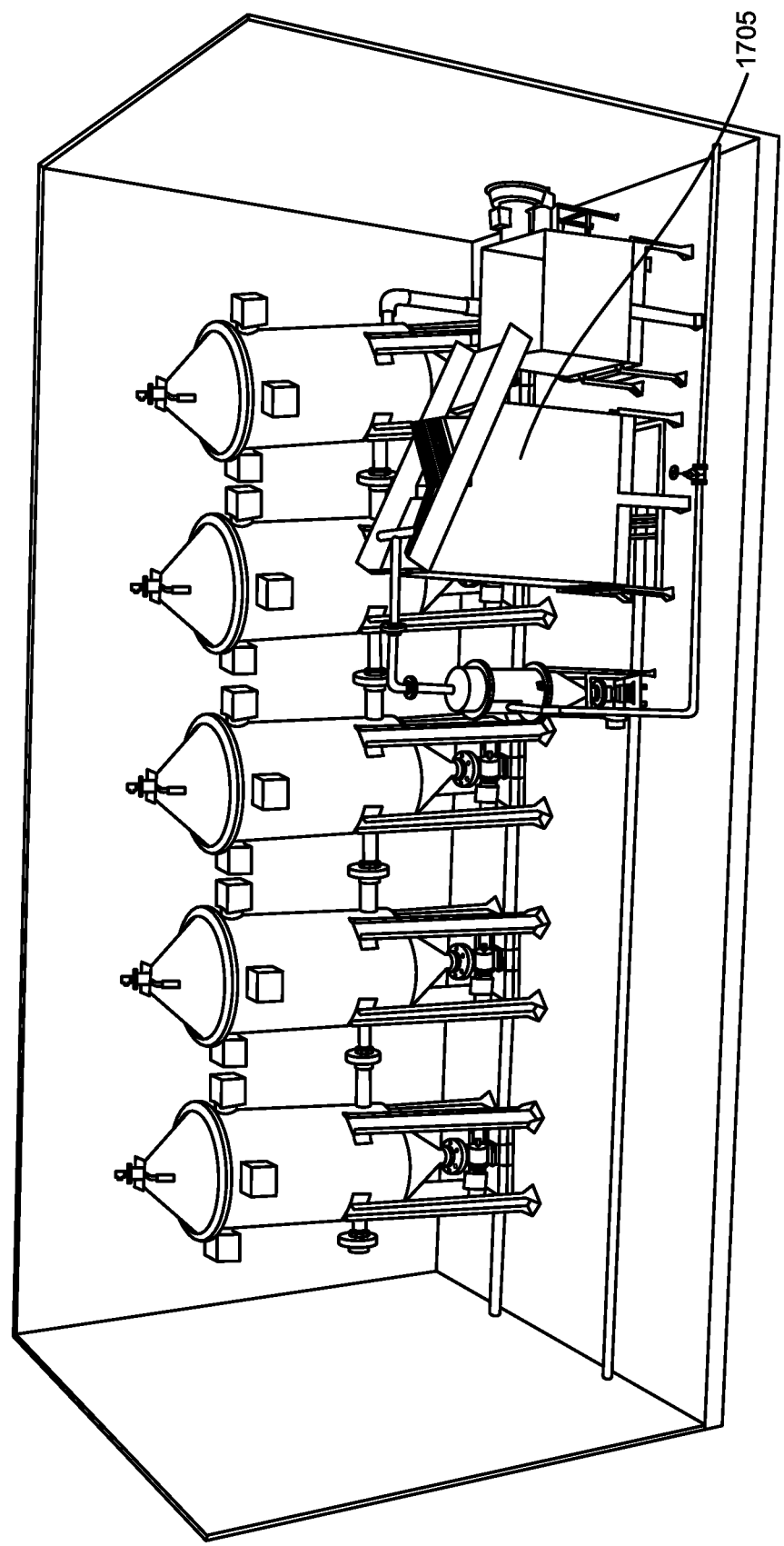
Figure 20:
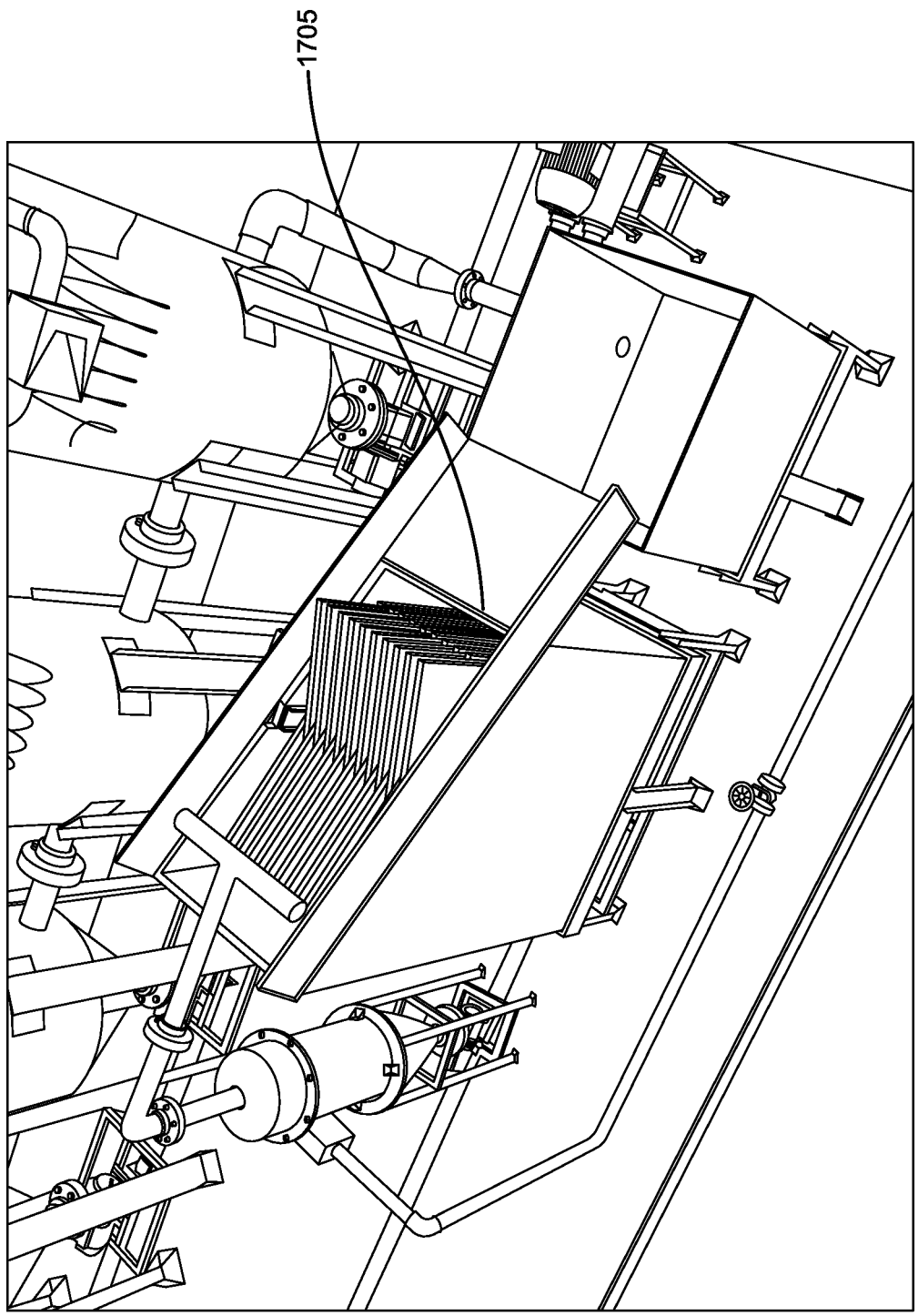
Figure 21:
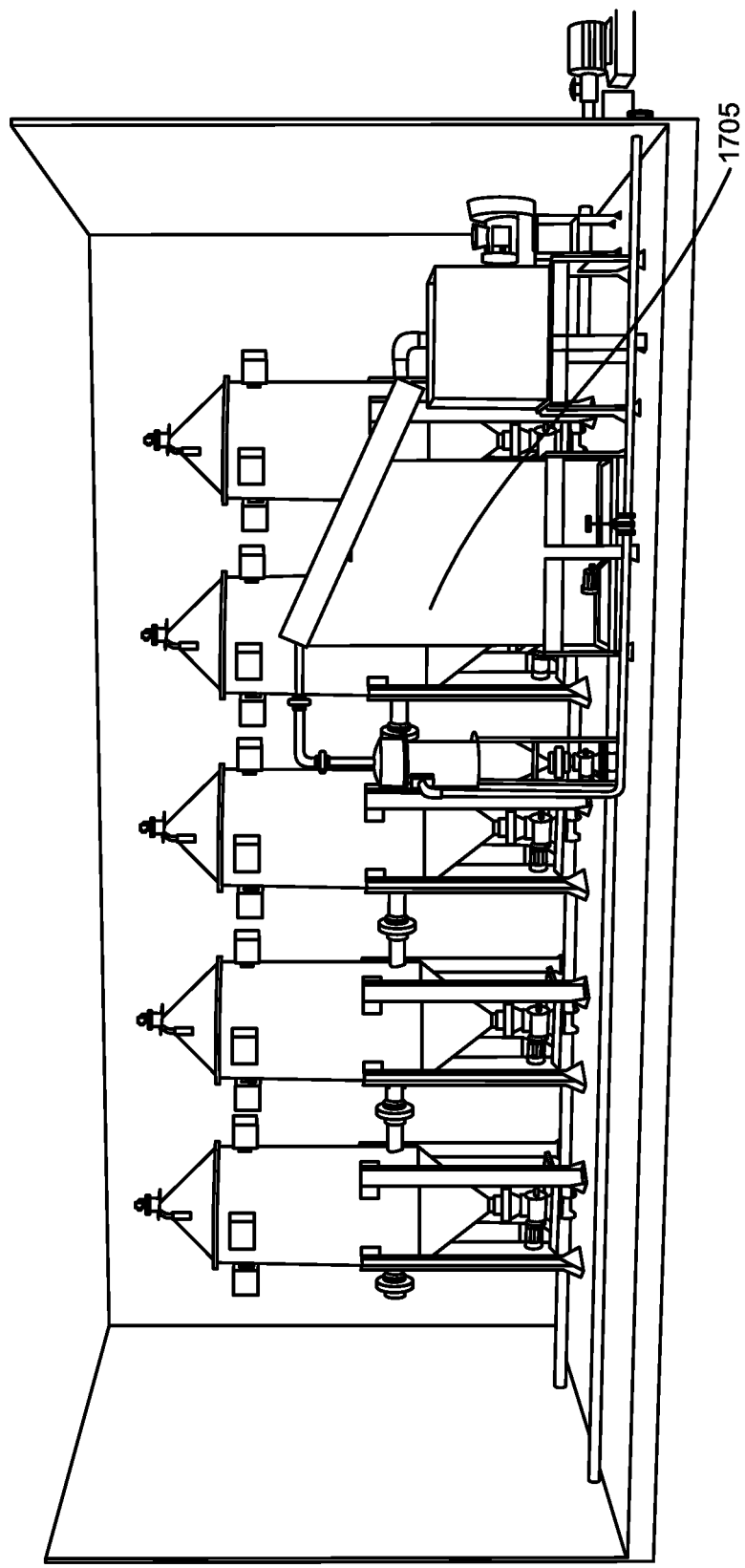

FIGS. 14-16 illustrate example heating elements and related dimensions according to an example implementation. As shown in FIG. 14, more than one heating element may be disposed within a single separator to achieve a required heating power. In particular, the multiple heating elements may be electrically connected in series or in parallel. Each of the heating elements may have appropriate dimensions as shown in FIGS. 15 and 16 based on the size of the separator.

FIGS. 17-21 illustrate a modular processing system, which can be scaled to any required processing capabilities by adding additional units. The illustrated modular processing system includes a bacterial removal unit 1705 downstream from the hydrocyclone.

Although a few variations have been described in detail above, other modifications or additions are possible.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system comprising:
    a first separator configured to receive waste water, retain a first portion of the waste water, and separate the first portion of the waste water into a first vapor and a first solid material; and
    a second separator in fluid communication with the first separator, the second separator being configured to receive a second portion of the waste water from the first separator and to separate the second portion of the waste water into a second vapor and a second solid material, the second separator including
        a first condenser in fluid communication with the first separator, the first condenser being configured to receive the first vapor from the first separator and transfer heat from the first vapor to the second portion of the waste water, thereby condensing the first vapor into a first liquid,
        a heating element configured to generate heat and transfer the heat to the second portion of the waste water, wherein heat from the first vapor and heat from the heating element cause at least a portion of the second portion of waste water to evaporate, thereby forming the second vapor within the second separator, and
        a first electrocoagulation unit having at least one first electrocoagulation cell that includes a first anode and a first cathode that are in contact with the second portion of the waste water, the at least one first electrocoagulation cell being configured to separate suspended solids from the second portion of the waste water, the separated suspended solids forming at least a portion of the second solid material.

2. The system of claim 1, wherein the first separator includes
    a second condenser in fluid communication with the second separator, the second condenser being configured to receive the second vapor from the second separator and transfer heat from the second vapor to the first portion of the waste water, thereby condensing the second vapor into a second liquid.

3. The system of claim 2, wherein the first separator includes
    a second electrocoagulation unit having at least one second electrocoagulation cell in contact with the first portion of the waste water, the at least one second electrocoagulation cell being configured to separate suspended solids from the first portion of the waste water, the separated suspended solids forming at least a portion of the first solid material.

4. The system of claim 1, further comprising a controller in electronic communication with the heating element and the first electrocoagulation unit, the controller being configured to control the amount of heat generated by the heating element and to control a first voltage differential between the first anode and the first cathode of at least one first electrocoagulation cell, wherein the first voltage differential determines a rate at which suspended solids are separated from the second portion of the waste water.

5. The system of claim 4, wherein the second separator includes
    a magnetron configured to generate microwaves and direct at least a portion of the microwaves at the second portion of the waste water within the second separator, thereby heating the second portion of the waste water.

6. The system of claim 4, further comprising
    a preliminary separator in fluid communication with the first separator, the preliminary separator being configured to receive the waste water and to separate insoluble solid material from the waste water, remove the insoluble solid material from the waste water, and provide the waste water to the first separator.

7. The system of claim 6, wherein the preliminary separator is a hydrocyclone configured to direct the received waste water tangentially about an interior surface of the hydrocyclone, thereby generating a reactive centrifugal force that acts on the received waste water to separate the insoluble solid material from the received waste water.

8. The system of claim 4, further comprising at least one first pressure gauge coupled to the second separator, the at least one first pressure gauge being configured to measure a pressure of the second vapor within the second separator.

9. The system of claim 8, further comprising at least one second pressure gauge coupled to the first separator, the at least one second pressure gauge being configured to measure a pressure of the first vapor within the first separator.

10. The system of claim 1, further comprising a first level meter positioned within the second separator, the first level meter being configured to measure an amount of the second portion of waste water.

11. The system of claim 1, further comprising a first demister positioned within the second separator, the first demister being configured to remove liquid droplets entrained within the second vapor.

12. The system of claim 11, further comprising a second demister positioned within the first separator, the second demister being configured to remove liquid droplets entrained within the first vapor.

13. A method comprising:
receiving waste water at a first separator, and retaining a first portion of the waste water within the first separator;
receiving, at a second separator, a second portion of waste water from the first separator;
generating a first voltage differential between a first anode and a first cathode of a first cell of a first electrocoagulation unit to remove suspended solids from the second portion of waste water;
receiving a first vapor from the first separator at a first condenser within the second separator;
transferring heat from the first vapor to the second portion of the waste water, thereby condensing the first vapor into a first liquid;
generating heat using a first heating element within the second separator;
transferring the heat to the second portion of waste water, wherein heat from the first vapor and heat from the heating element cause at least a portion of the second portion of waste water to evaporate, thereby forming a second vapor within the second separator; and
providing the second vapor to a second condenser within the first separator.

14. The method of claim 13, further comprising
receiving the second vapor at the second condenser; and
transferring heat from the second vapor to the first portion of waste water, thereby condensing the second vapor into a second liquid.

15. The method of claim 13, further comprising
generating a second voltage differential between a second anode and a second cathode of a second cell of a second electrocoagulation unit to remove suspended solids from the first portion of waste water.

16. The method of claim 13, further comprising
generating microwaves using a magnetron; and
directing at least a portion of the microwaves toward the second portion of waste water, thereby heating the second portion of waste water.

17. The method of claim 13, further comprising
measuring a pressure of the second vapor within the second separator using at least one first pressure gauge coupled to the second separator.

18. The method of claim 17, further comprising
measuring a pressure of the first vapor within the first separator using at least one second pressure gauge coupled to the first separator.

19. The method of claim 13, further comprising
removing liquid droplets entrained within the second vapor using a first demister positioned within the second separator.

20. The method of claim 19, further comprising
removing liquid droplets entrained within the first vapor using a second demister positioned within the first separator.

21. A system comprising:
a first separator configured to receive waste water, retain a first portion of the waste water, and separate the first portion of the waste water into a first vapor and a first solid material, the first separator including a first condenser and a first electrocoagulation unit; and
a second separator in fluid communication with the first separator, the second separator being configured to receive a second portion of the waste water from the first separator and to separate the second portion of the waste water into a second vapor and a second solid material,
wherein the second separator includes a second condenser in fluid communication with the first separator, the second condenser being configured to receive the first vapor from the first separator and transfer heat from the first vapor to the second portion of the waste water, thereby condensing the first vapor into a first liquid.

22. The system of claim 21, wherein the second separator includes:
a heating element configured to generate heat and transfer the heat to the second portion of the waste water, wherein heat from the first vapor and heat from the heating element cause at least a portion of the second portion of waste water to evaporate, thereby forming the second vapor within the second separator.

23. The system of claim 22, wherein the second separator includes:
a second electrocoagulation unit having at least one first electrocoagulation cell that includes a first anode and a first cathode that are in contact with the second portion of the waste water, the at least one first electrocoagulation cell being configured to separate suspended solids from the second portion of the waste water, the separated suspended solids forming at least a portion of the second solid material.

24. The system of claim 21, further comprising a total of n separators (n being a natural number; n≥2),
wherein, for an i-th separator (i being any natural number; 2≥i≥n), the i-th separator is in communication with the (i−1)-th separator, the i-th separator configured to receive an i-th portion of the waste water from the (i−1)-th separator and to separate the i-th portion of the waste water into an i-th vapor and an i-th solid material, the i-th separator including an i-th condenser and an i-th electrocoagulation unit.

25. The system of claim 24, wherein the n-th separator includes a heating element configured to generate heat and transfer the heat to the n-th portion of the waste water, wherein heat from the (n−1)-th vapor and heat from the heating element cause at least a portion of the n-th portion of waste water to evaporate, thereby forming the n-th vapor within the n-th separator.

26. The system of claim 24, wherein the n-th separator includes a magnetron configured to generate microwaves and direct at least a portion of the microwaves at the n-th portion of the waste water within the n-th separator, thereby heating the n-th portion of the waste water.

27. The system of claim 24, wherein at least one of the first to the n-th separators includes a demister configured to remove liquid droplets entrained within vapor.

28. The system of claim 24, further comprising:
a preliminary separator in fluid communication with the first separator, the preliminary separator being configured to receive the waste water and to separate insoluble solid material from the waste water, remove the insoluble solid material from the waste water, and provide the waste water to the first separator.

29. The system of claim 28, wherein the preliminary separator is a hydrocyclone configured to direct the received waste water tangentially about an interior surface of the hydrocyclone, thereby generating a reactive centrifugal force that acts on the received waste water to separate the insoluble solid material from the received waste water.

30. The system of claim 21, wherein the first separator includes a heating element.

31. A system comprising:
a first separator configured to receive waste water, retain a first portion of the waste water, and separate the first portion of the waste water into a first vapor and a first solid material, the first separator including a first condenser and a first electrocoagulation unit; and
a total of n separators (n being a natural number; n≥2), wherein, for an i-th separator (i being any natural number; 2≤i≤n), the i-th separator is in communication with the (i−1)-th separator, the i-th separator configured to receive an i-th portion of the waste water from the (i−1)-th separator and to separate the i-th portion of the waste water into an i-th vapor and an i-th solid material, the i-th separator including an i-th condenser and an i-th electrocoagulation unit,
wherein the n-th separator includes a heating element configured to generate heat and transfer the heat to the n-th portion of the waste water, wherein heat from the (n−1)-th vapor and heat from the heating element cause at least a portion of the n-th portion of waste water to evaporate, thereby forming the n-th vapor within the n-th separator.

32. A system comprising:
a first separator configured to receive waste water, retain a first portion of the waste water, and separate the first portion of the waste water into a first vapor and a first solid material, the first separator including a first condenser and a first electrocoagulation unit; and
a total of n separators (n being a natural number; n≥2), wherein, for an i-th separator (i being any natural number; 2≤i≤n), the i-th separator is in communication with the (i−1)-th separator, the i-th separator configured to receive an i-th portion of the waste water from the (i−1)-th separator and to separate the i-th portion of the waste water into an i-th vapor and an i-th solid material, the i-th separator including an i-th condenser and an i-th electrocoagulation unit,
wherein the n-th separator includes a magnetron configured to generate microwaves and direct at least a portion of the microwaves at the n-th portion of the waste water within the n-th separator, thereby heating the n-th portion of the waste water.

33. A system comprising:
a first separator configured to receive waste water, retain a first portion of the waste water, and separate the first portion of the waste water into a first vapor and a first solid material, the first separator including a first condenser and a first electrocoagulation unit; and
a total of n separators (n being a natural number; n≥2), wherein, for an i-th separator (i being any natural number; 2≤i≤n), the i-th separator is in communication with the (i−1)-th separator, the i-th separator configured to receive an i-th portion of the waste water from the (i−1)-th separator and to separate the i-th portion of the waste water into an i-th vapor and an i-th solid material, the i-th separator including an i-th condenser and an i-th electrocoagulation unit,
wherein at least one of the first to the n-th separators includes a demister configured to remove liquid droplets entrained within vapor.

34. A system comprising:
a first separator configured to receive the waste water, retain a first portion of the waste water, and separate the first portion of the waste water into a first vapor and a first solid material, the first separator including a first condenser and a first electrocoagulation unit; and
a total of n separators (n being a natural number; n≥2), wherein, for an i-th separator (i being any natural number; 2≤i≤n), the i-th separator is in communication with the (i−1)-th separator, the i-th separator configured to receive an i-th portion of the waste water from the (i−1)-th separator and to separate the i-th portion of the waste water into an i-th vapor and an i-th solid material, the i-th separator including an i-th condenser and an i-th electrocoagulation unit,
a preliminary separator in fluid communication with the first separator, the preliminary separator being configured to receive waste water and to separate insoluble solid material from the waste water, remove the insoluble solid material from the waste water, and provide the waste water to the first separator,
wherein the preliminary separator is a hydrocyclone configured to direct the received waste water tangentially about an interior surface of the hydrocyclone, thereby generating a reactive centrifugal force that acts on the received waste water to separate the insoluble solid material from the received waste water.

* * * * *